United States Patent
Maeda et al.

(10) Patent No.: US 10,161,476 B2
(45) Date of Patent: Dec. 25, 2018

(54) MACHINE HAVING RECIPROCATING SLIDER CRANK MECHANISM, AND METHOD FOR DESIGNING MACHINE HAVING RECIPROCATING SLIDER CRANK MECHANISM

(71) Applicant: YAMAHA HATSUDOKI KABUSHIKI KAISHA, Iwata-shi, Shizuoka (JP)

(72) Inventors: Kazuyuki Maeda, Iwata (JP); Masahiro Onodera, Iwata (JP)

(73) Assignee: YAMAHA HATSUDOKI KABUSHIKI KAISHA, Iwata-Shi, Shizuoka (JP)

( * ) Notice: Subject to any disclaimer, the term of this patent is extended or adjusted under 35 U.S.C. 154(b) by 68 days.

(21) Appl. No.: 15/511,029

(22) PCT Filed: Jun. 7, 2016

(86) PCT No.: PCT/JP2016/066905
§ 371 (c)(1),
(2) Date: Mar. 14, 2017

(87) PCT Pub. No.: WO2017/141458
PCT Pub. Date: Aug. 24, 2017

(65) Prior Publication Data
US 2018/0223950 A1 Aug. 9, 2018

(30) Foreign Application Priority Data
Feb. 19, 2016 (JP) .................. 2016-029824

(51) Int. Cl.
*F16F 15/26* (2006.01)
*F02B 77/14* (2006.01)
(Continued)

(52) U.S. Cl.
CPC ............ *F16F 15/265* (2013.01); *F02B 77/14* (2013.01); *F16C 3/26* (2013.01); *F02B 75/18* (2013.01); *F02F 7/0004* (2013.01)

(58) Field of Classification Search
CPC ......... F16F 15/265; F02B 77/14; F02B 75/18; F16C 3/26; F02F 7/0004
See application file for complete search history.

(56) References Cited

U.S. PATENT DOCUMENTS 4,802,450 A * 2/1989 Roberts ................ F16F 15/264
123/192.2
5,272,937 A 12/1993 Brosowske et al.
(Continued)

FOREIGN PATENT DOCUMENTS

CN 1573161 A 2/2005
CN 1985105 A 6/2007
(Continued)

*Primary Examiner* — Jacob Amick
(74) *Attorney, Agent, or Firm* — Rabin & Berdo, P.C.

(57) ABSTRACT

A machine having a reciprocating slider crank mechanism, wherein an axis of a crankshaft, an axis of a first balancer shaft and an axis of a second balancer shaft are not arranged on the same plane, wherein vibration is highly controlled. The machine includes the reciprocating slider crank mechanism configured so as to satisfy setting formulae below:

$U_{Cr} = U_P \times 0.5$ $\alpha_{Cr} = 180°$ $U_{B(Fr)} = \{U1_{B(Fr)}^+ + U2_{B(Fr)}^2\}^{1/2}$ $U1_{B(Fr)} = -U_P \times 0.5 \times \{Lx'_{B(Rr)}/(Lx'_{B(Rr)} - Lx'_{B(Fr)})\}$ $U2_{B(Fr)} = U_P \times 0.5 \times \{Ly'_B/(Lx'_{B(Rr)} - Lx'_{B(Fr)})\}$ $\alpha_{B(Fr)} = 180° - \arctan(U2_{B(Fr)}/U1_{B(Fr)})$ (Continued)

$$U_{B(Rr)} = \{U1_{B(Rr)}^2 + U2_{B(Rr)}^2\}^{1/2}$$

$$U1_{B(Rr)} = -U_P \times 0.5 \times \{Lx'_{B(Fr)}/(Lx'_{B(Fr)} - Lx'_{B(Rr)})\}$$

$$U2_{B(Rr)} = -U2_{B(Fr)}$$

$$\alpha_{B(Rr)} = 180° - \arctan(U2_{B(Rr)}/U1_{B(Rr)}).$$

8 Claims, 11 Drawing Sheets

(51) Int. Cl.
  *F16C 3/26* (2006.01)
  *F02B 75/18* (2006.01)
  *F02F 7/00* (2006.01)

(56) References Cited

U.S. PATENT DOCUMENTS

| | | | |
|---|---|---|---|
| 2004/0045520 A1* | 3/2004 | Slopsema | F02B 75/06 |
| | | | 123/192.2 |
| 2004/0206327 A1 | 10/2004 | Utsumi | |
| 2017/0114859 A1* | 4/2017 | Tsukamoto | F16F 15/264 |

FOREIGN PATENT DOCUMENTS

| | | |
|---|---|---|
| JP | 42-15161 B1 | 8/1967 |
| JP | S56-141440 A | 11/1981 |
| JP | H03-28544 A | 2/1991 |
| JP | H09-166182 A | 6/1997 |
| JP | 2004-286218 A | 10/2004 |
| JP | 2006-002613 A | 1/2006 |
| JP | 2013-002364 A | 1/2013 |
| WO | WO-03/071157 A1 | 8/2003 |

* cited by examiner

FIG. 9

Table 1

| Crankshaft angle | Reciprocal movement portion | | Rotary movement portion | | First balancer | | | | | Second balancer | | | | | Total | | |
|---|---|---|---|---|---|---|---|---|---|---|---|---|---|---|---|---|---|
| | Primary inertial force | Moment | Centrifugal force | | Centrifugal force | | Moment | | | Centrifugal force | | Moment | | | Translational force | | Rotational force |
| | y direction | y component | x direction | y direction | x direction | y direction | x component | y component | | x direction | y direction | Moment x component | Moment y component | | x direction | y direction | Pitch |
| | Fyp | Myp | Fxcr | Fycr | FxB(Fr) | FyB(Fr) | MxB(Fr) | MyB(Fr) | | FxB(Rr) | FyB(Rr) | MxB(Rr) | MyB(Rr) | | Fx | Fy | M |
| (deg) | (N) | (N·m) | (N) | (N) | (N) | (N) | (N·m) | (N·m) | | (N) | (N) | (N·m) | (N·m) | | (N) | (N) | (N·m) |
| 0 | 5922 | 0 | 0 | −2961 | −465 | −1589 | 2 | 89 | | 465 | −1372 | −15 | −76 | | 0 | 0 | 0 |
| 15 | 5720 | 0 | 766 | −2860 | −860 | −1415 | 4 | 79 | | 94 | −1445 | −3 | −80 | | 0 | 0 | 0 |
| 30 | 5128 | 0 | 1480 | −2564 | −1197 | −1144 | 6 | 64 | | −284 | −1420 | 9 | −79 | | 0 | 0 | 0 |
| 45 | 4187 | 0 | 2094 | −2094 | −1452 | −795 | 7 | 44 | | −642 | −1299 | 21 | −72 | | 0 | 0 | 0 |
| 60 | 2961 | 0 | 2564 | −1480 | −1608 | −392 | 8 | 22 | | −956 | −1088 | 31 | −60 | | 0 | 0 | 0 |
| 75 | 1533 | 0 | 2860 | −766 | −1655 | 37 | 8 | −2 | | −1205 | −804 | 39 | −45 | | 0 | 0 | 0 |
| 90 | 0 | 0 | 2961 | 0 | −1589 | 465 | 8 | −26 | | −1372 | −465 | 44 | −26 | | 0 | 0 | 0 |
| 105 | −1533 | 0 | 2860 | 766 | −1415 | 860 | 7 | −48 | | −1445 | −94 | 46 | −5 | | 0 | 0 | 0 |
| 120 | −2961 | 0 | 2564 | 1480 | −1144 | 1197 | 6 | −67 | | −1420 | 284 | 45 | 16 | | 0 | 0 | 0 |
| 135 | −4187 | 0 | 2094 | 2094 | −795 | 1452 | 4 | −81 | | −1299 | 642 | 42 | 36 | | 0 | 0 | 0 |
| 150 | −5128 | 0 | 1480 | 2564 | −392 | 1608 | 2 | −90 | | −1088 | 956 | 35 | 53 | | 0 | 0 | 0 |
| 165 | −5720 | 0 | 766 | 2860 | 37 | 1655 | 0 | −92 | | −804 | 1205 | 26 | 67 | | 0 | 0 | 0 |
| 180 | −5922 | 0 | 0 | 2961 | 465 | 1589 | −2 | −89 | | −465 | 1372 | 15 | 76 | | 0 | 0 | 0 |
| 195 | −5720 | 0 | −766 | 2860 | 860 | 1415 | −4 | −79 | | −94 | 1445 | 3 | 80 | | 0 | 0 | 0 |
| 210 | −5128 | 0 | −1480 | 2564 | 1197 | 1144 | −6 | −64 | | 284 | 1420 | −9 | 79 | | 0 | 0 | 0 |
| 225 | −4187 | 0 | −2094 | 2094 | 1452 | 795 | −7 | −44 | | 642 | 1299 | −21 | 72 | | 0 | 0 | 0 |
| 240 | −2961 | 0 | −2564 | 1480 | 1608 | 392 | −8 | −22 | | 956 | 1088 | −31 | 60 | | 0 | 0 | 0 |
| 255 | −1533 | 0 | −2860 | 766 | 1655 | −37 | −8 | 2 | | 1205 | 804 | −39 | 45 | | 0 | 0 | 0 |
| 270 | 0 | 0 | −2961 | 0 | 1589 | −465 | −8 | 26 | | 1372 | 465 | −44 | 26 | | 0 | 0 | 0 |
| 285 | 1533 | 0 | −2860 | −766 | 1415 | −860 | −7 | 48 | | 1445 | 94 | −46 | 5 | | 0 | 0 | 0 |
| 300 | 2961 | 0 | −2564 | −1480 | 1144 | −1197 | −6 | 67 | | 1420 | −284 | −45 | −16 | | 0 | 0 | 0 |
| 315 | 4187 | 0 | −2094 | −2094 | 795 | −1452 | −4 | 81 | | 1299 | −642 | −42 | −36 | | 0 | 0 | 0 |
| 330 | 5128 | 0 | −1480 | −2564 | 392 | −1608 | −2 | 90 | | 1088 | −956 | −35 | −53 | | 0 | 0 | 0 |
| 345 | 5720 | 0 | −766 | −2860 | −37 | −1655 | 0 | 92 | | 804 | −1205 | −26 | −67 | | 0 | 0 | 0 |
| 360 | 5922 | 0 | 0 | −2961 | −465 | −1589 | 2 | 89 | | 465 | −1372 | −15 | −76 | | 0 | 0 | 0 |

FIG.10

Table 2

| Crankshaft angle | Reciprocal movement portion | | Rotary movement portion | | First balancer | | | | | Second balancer | | | | | Total | | |
|---|---|---|---|---|---|---|---|---|---|---|---|---|---|---|---|---|---|
| | Primary inertial force | Moment | Centrifugal force | | Centrifugal force | | Moment | | Centrifugal force | | Moment | | Translational force | | Rotational force | | |
| | Y direction Fyp | y component Myp | X direction Fxcr | Y direction Fycr | X direction FxB(Fr) | Y direction FyB(Fr) | x component MxB(Fr) | y component MyB(Fr) | X direction FxB(Rr) | Y direction FyB(Rr) | Moment x component MxB(Rr) | Moment y component MyB(Rr) | X direction Fx | Y direction Fy | Pitch M | | |
| (deg) | (N) | (N·m) | (N) | | (N) | | (N·m) | | (N) | | (N·m) | | (N) | | (N·m) | | |
| 0 | 5922 | -47 | -197 | -2961 | -234 | -2015 | 1 | 112 | 431 | -945 | -14 | -52 | 0 | 0 | 0 | | |
| 15 | 5822 | -47 | 576 | -2911 | -747 | -1886 | 4 | 105 | 172 | -1025 | -5 | -57 | 0 | 0 | 0 | | |
| 30 | 5326 | -43 | 1309 | -2663 | -1210 | -1629 | 6 | 91 | -99 | -1034 | 3 | -57 | 0 | 0 | 0 | | |
| 45 | 4466 | -36 | 1954 | -2233 | -1590 | -1260 | 8 | 70 | -364 | -973 | 12 | -54 | 0 | 0 | 0 | | |
| 60 | 3303 | -26 | 2466 | -1651 | -1862 | -805 | 9 | 45 | -603 | -846 | 19 | -47 | 0 | 0 | 0 | | |
| 75 | 1914 | -15 | 2809 | -957 | -2007 | -296 | 10 | 17 | -802 | -661 | 26 | -37 | 0 | 0 | 0 | | |
| 90 | 395 | -3 | 2961 | -197 | -2015 | 234 | 10 | -13 | -945 | -431 | 30 | -24 | 0 | 0 | 0 | | |
| 105 | -1151 | 9 | 2911 | 576 | -1886 | 747 | 9 | -42 | -1025 | -172 | 33 | -10 | 0 | 0 | 0 | | |
| 120 | -2619 | 21 | 2663 | 1309 | -1629 | 1210 | 8 | -68 | -1034 | 99 | 33 | 6 | 0 | 0 | 0 | | |
| 135 | -3908 | 31 | 2233 | 1954 | -1260 | 1590 | 6 | -89 | -973 | 364 | 31 | 20 | 0 | 0 | 0 | | |
| 150 | -4931 | 39 | 1651 | 2466 | -805 | 1862 | 4 | -104 | -846 | 603 | 27 | 33 | 0 | 0 | 0 | | |
| 165 | -5618 | 45 | 957 | 2809 | -296 | 2007 | 1 | -112 | -661 | 802 | 21 | 44 | 0 | 0 | 0 | | |
| 180 | -5922 | 47 | 197 | 2961 | 234 | 2015 | -1 | -112 | -431 | 945 | 14 | 52 | 0 | 0 | 0 | | |
| 195 | -5822 | 47 | -576 | 2911 | 747 | 1886 | -4 | -105 | -172 | 1025 | 5 | 57 | 0 | 0 | 0 | | |
| 210 | -5326 | 43 | -1309 | 2663 | 1210 | 1629 | -6 | -91 | 99 | 1034 | -3 | 57 | 0 | 0 | 0 | | |
| 225 | -4466 | 36 | -1954 | 2233 | 1590 | 1260 | -8 | -70 | 364 | 973 | -12 | 54 | 0 | 0 | 0 | | |
| 240 | -3303 | 26 | -2466 | 1651 | 1862 | 805 | -9 | -45 | 603 | 846 | -19 | 47 | 0 | 0 | 0 | | |
| 255 | -1914 | 15 | -2809 | 957 | 2007 | 296 | -10 | -17 | 802 | 661 | -26 | 37 | 0 | 0 | 0 | | |
| 270 | -395 | 3 | -2961 | 197 | 2015 | -234 | -10 | 13 | 945 | 431 | -30 | 24 | 0 | 0 | 0 | | |
| 285 | 1151 | -9 | -2911 | -576 | 1886 | -747 | -9 | 42 | 1025 | 172 | -33 | 10 | 0 | 0 | 0 | | |
| 300 | 2619 | -21 | -2663 | -1309 | 1629 | -1210 | -8 | 68 | 1034 | -99 | -33 | -6 | 0 | 0 | 0 | | |
| 315 | 3908 | -31 | -2233 | -1954 | 1260 | -1590 | -6 | 89 | 973 | -364 | -31 | -20 | 0 | 0 | 0 | | |
| 330 | 4931 | -39 | -1651 | -2466 | 805 | -1862 | -4 | 104 | 846 | -603 | -27 | -33 | 0 | 0 | 0 | | |
| 345 | 5618 | -45 | -957 | -2809 | 296 | -2007 | -1 | 112 | 661 | -802 | -21 | -44 | 0 | 0 | 0 | | |
| 360 | 5922 | -47 | -197 | -2961 | -234 | -2015 | 1 | 112 | 431 | -945 | -14 | -52 | 0 | 0 | 0 | | |

MACHINE HAVING RECIPROCATING SLIDER CRANK MECHANISM, AND METHOD FOR DESIGNING MACHINE HAVING RECIPROCATING SLIDER CRANK MECHANISM

TECHNICAL FIELD

The present invention relates to a machine having a reciprocating slider crank mechanism (hereinafter referred to as a "reciprocating machine"), such as an internal combustion engine, a reciprocating pump or a reciprocating gas compressor, and a method for designing a reciprocating machine.

BACKGROUND ART

In a reciprocating machine such as an internal combustion engine, an inertial force is generated by the movement of a reciprocal movement portion such as a piston. Conventionally, in a reciprocating machine, a rotary movement portion such as a crankshaft and a balancer shaft are given an unbalance so as to generate a centrifugal force that is in balance with the inertial force of the reciprocal movement portion, thereby controlling vibration.

FIG. 11 is a view schematically showing a conventional reciprocating engine including a so-called two-axis primary balancer. The engine includes a reciprocal movement portion 570 and a rotary movement portion 530, wherein the reciprocal movement portion 570 includes a piston 550 reciprocating in a cylinder (not shown), a piston pin 555, and a conrod small end portion 560 connected to the piston 550 by the piston pin 555, and the rotary movement portion 530 includes a rotatable crankshaft 500 and a conrod big end portion 565 connected to a crank pin portion 556 of the crankshaft 500. The engine also includes a first balancer shaft 510 arranged forward of the crankshaft 500, and a second balancer shaft 520 arranged rearward of the crankshaft 500. The first balancer shaft 510 and the second balancer shaft 520 are configured to rotate at the same rotation speed as that of the crankshaft 500 and in the opposite rotation direction to that of the crankshaft 500. An axis 500c of the crankshaft 500, an axis 510c of the first balancer shaft 510 and an axis 520c of the second balancer shaft 520 are arranged on the same plane P.

Now, assume that the axis 500c of the crankshaft 500 is the origin, the axis extending from the origin toward the piston 550 along the center line of the cylinder is the Y axis and the axis perpendicular to the Y axis is the X axis as seen from the axial direction of the crankshaft 500, and the rotation direction of the crankshaft 500 is the forward rotation direction and the opposite direction to the rotation direction of the crankshaft 500 is the reverse rotation direction as seen from the axial direction of the crankshaft 500, and assume that:

$Lx_{B(Fr)}$: X coordinate value of the axis 510c of the first balancer shaft 510

$Ly_{B(Fr)}$: Y coordinate value of the axis 510c of the first balancer shaft 510

$Lx_{B(Rr)}$: X coordinate value of the axis 520c of the second balancer shaft 520

$Ly_{B(Rr)}$: Y coordinate value of the axis 520c of the second balancer shaft 520

$\gamma_{B(Fr)}$: angle, in the forward rotation direction, of the straight line connecting between the axis 510c of the first balancer shaft 510 and the axis 500c of the crankshaft 500, from the Y axis, as seen from the axial direction of the crankshaft $500 = 90° + \arctan(Ly_{B(Fr)}/Lx_{B(Fr)})$ $\gamma_{B(Rr)}$: angle, in the forward rotation direction, of the straight line connecting between the axis 520c of the second balancer shaft 520 and the axis 500c of the crankshaft 500, from the Y axis, as seen from the axial direction of the crankshaft 500 ($=\gamma_{B(Fr)}$)

$\theta_{Cr}$: rotation angle of the crankshaft 500 in the forward rotation direction (where $\theta_{Cr}$ is assumed to be 0° when the crank pin portion 556 of the crankshaft 500 is on the Y axis)

$U_P$: unbalance amount of the reciprocal movement portion $570 = m_P \times R$ (where $m_P$ is the mass of the reciprocal movement portion 570, and R is the crank radius)

$U_{Cr}$: unbalance amount of the rotary movement portion $530 = m_{Cr} \times r_{Cr}$ (where $m_{Cr}$ is the mass of the rotary movement portion 530, and $r_{Cr}$ is the distance between the axis 500c of the crankshaft 500 and the center of gravity of the rotary movement portion 530)

$\alpha_{Cr}$: unbalance direction (the angle in the forward rotation direction from the Y axis) of the rotary movement portion 530 when $\theta_{Cr}=0°$ $U_{B(Fr)}$: unbalance amount of the first balancer shaft $510 = m_{B(Fr)} \times r_{B(Fr)}$ (where $m_{B(Fr)}$ is the mass of the first balancer shaft 510, and $r_{B(Fr)}$ is the distance between the axis 510c of the first balancer shaft 510 and the center of gravity of the first balancer shaft 510)

$\alpha_{B(Fr)}$: unbalance direction (the angle in the forward rotation direction from the Y axis) of the first balancer shaft 510 when $\theta_{Cr}=0°$ $U_{B(Rr)}$: unbalance amount of the second balancer shaft $520 = m_{B(Rr)} \times r_{B(Rr)}$ (where $m_{B(Rr)}$ is the mass of the second balancer shaft 520, and $r_{B(Rr)}$ is the distance between the axis 520c of the second balancer shaft 520 and the center of gravity of the second balancer shaft 520)

$\alpha_{B(Rr)}$: unbalance direction (the angle in the forward rotation direction from the Y axis) of the second balancer shaft 520 when $\theta_{Cr}=0°$ In a conventional method for designing a reciprocating machine, $U_{Cr}$, $\alpha_{Cr}$, $U_{B(Fr)}$, $U_{B(Rr)}$, $\alpha_{B(Fr)}$ and $\alpha_{B(Rr)}$ are set so as to satisfy setting formulae below:

$$U_{Cr} = U_P \times 0.5$$

$$\alpha_{Cr} = 180°$$

$$U_{B(Fr)} = U_P \times 0.5 \times (Lx_{B(Rr)}/\sin \gamma_{B(Rr)})/\{(Lx_{B(Rr)}/\sin \gamma_{B(Rr)}) - (Lx_{B(Fr)}/\sin \gamma_{B(Fr)})\}$$

$$\alpha_{B(Fr)} = 180°$$

$$U_{B(Rr)} = U_P \times 0.5 \times (Lx_{B(Fr)}/\sin \gamma_{B(Fr)})/\{(Lx_{B(Fr)}/\sin \gamma_{B(Fr)}) - (Lx_{B(Rr)}/\sin \gamma_{B(Rr)})\}$$

$$\alpha_{B(Rr)} = 180°.$$

According to the reciprocating machine and the design method described above, the primary inertial force of the reciprocal movement portion 570, the centrifugal force generated by the rotary movement portion 530, the centrifugal force generated by the first balancer shaft 510 and the centrifugal force generated by the second balancer shaft 520, which are generated by the operation of the reciprocating machine, are in balance with each other. Moreover, the moments generated due to difference between lines of action of the primary inertial force and the centrifugal forces are in balance with each other. Thus, it is possible to highly control the translational vibration caused by the primary inertial force and the centrifugal forces of the reciprocating machine, and the rotational vibration caused by the moments.

With the limitation on the layout of the reciprocating machine, etc., it is difficult in some cases to arrange the axis 500c of the crankshaft 500, the axis 510c of the first balancer shaft 510 and the axis 520c of the second balancer shaft 520 on the same plane P. For example, Patent Document No. 1 discloses an engine, in which the axis of the crankshaft, the axis of the first balancer shaft and the axis of the second balancer shaft are not arranged on the same plane.

CITATION LIST

Patent Literature

[Patent Document No. 1] Japanese Laid-Open Patent Publication No. 3-28544

SUMMARY OF INVENTION

However, there is no conventional method for designing a first balancer shaft and a second balancer shaft of a reciprocating machine, wherein the axis of the crankshaft, the axis of the first balancer shaft and the axis of the second balancer shaft are not arranged on the same plane, and wherein it is possible to highly control the vibration. With conventional design processes, the primary inertial force of the reciprocal movement portion, the centrifugal force of the rotary movement portion, the centrifugal force of the first balancer shaft and the centrifugal force of the second balancer shaft are in balance with each other, and it is possible to control the translational vibration. However, since the axis of the crankshaft, the axis of the first balancer shaft and the axis of the second balancer shaft are not arranged on the same plane, a moment is newly generated around the crankshaft by the primary inertial force of the reciprocal movement portion, the centrifugal force of the rotary movement portion, the centrifugal force of the first balancer shaft and the centrifugal force of the second balancer shaft. With conventional design processes, it is not possible to control the rotational vibration generated by the moment. That is, it is not possible to highly control the vibration of the reciprocating machine since it is not possible to control the rotational vibration though it is possible to control the translational vibration.

It is an object of the present invention, which has been made in order to solve the problem, to provide a reciprocating machine, wherein the axis of the crankshaft, the axis of the first balancer shaft and the axis of the second balancer shaft are not arranged on the same plane, and wherein it is possible to highly control the translational vibration and the rotational vibration.

A reciprocating machine according to the present invention includes a reciprocal movement portion, a rotary movement portion, a first balancer shaft and a second balancer shaft. The reciprocal movement portion includes a piston configured to reciprocate in a cylinder, a piston pin, and a small end portion of a conrod connected to the piston by the piston pin. The rotary movement portion includes a rotatable crankshaft having a crank pin portion, and a big end portion of the conrod connected to the crank pin portion of the crankshaft. The first balancer shaft is configured to rotate, together with the rotation of the crankshaft, at the same rotation speed as that of the crankshaft in an opposite rotation direction to that of the crankshaft. The second balancer shaft is arranged on an opposite side from the first balancer shaft with respect to a center line of the cylinder as seen from an axial direction of the crankshaft, and is configured to rotate, together with the rotation of the crankshaft, at the same rotation speed as that of the crankshaft in an opposite rotation direction to that of the crankshaft. The axis of the crankshaft, the axis of the first balancer shaft and the axis of the second balancer shaft are not arranged on the same plane.

A method for designing a reciprocating machine according to the present invention is a method for designing the reciprocating machine described above.

Assume that the axis of the crankshaft is the origin, the axis extending from the origin toward the piston along the center line of the cylinder is the Y axis and the axis perpendicular to the Y axis is the X axis as seen from the axial direction of the crankshaft, and the rotation direction of the crankshaft is the forward rotation direction and the opposite direction to the rotation direction of the crankshaft is the reverse rotation direction as seen from the axial direction of the crankshaft, and assume that:

$Lx_{B(Fr)}$: X coordinate value of the axis of the first balancer shaft $Ly_{B(Fr)}$: Y coordinate value of the axis of the first balancer shaft $Lx_{B(Rr)}$: X coordinate value of the axis of the second balancer shaft $Ly_{B(Rr)}$: Y coordinate value of the axis of the second balancer shaft $\beta$: angle, in the forward rotation direction, of the straight line connecting between the axis of the first balancer shaft and the axis of the second balancer shaft, from the Y axis, as seen from the axial direction of the crankshaft=$90°+\arctan\{(Ly_{B(Rr)}-Ly_{B(Fr)})/(Lx_{B(Rr)}-Lx_{B(Fr)})\}$ $\gamma_{B(Fr)}$: angle, in the forward rotation direction, of the straight line connecting between the axis of the first balancer shaft and the axis of the crankshaft, from the Y axis, as seen from the axial direction of the crankshaft=$90°+\arctan(Ly_{B(Fr)}/Lx_{B(Fr)})$ $\gamma Y_{B(Rr)}$: angle, in the forward rotation direction, of the straight line connecting between the axis of the second balancer shaft and the axis of the crankshaft, from the Y axis, as seen from the axial direction of the crankshaft=$90°+\arctan(Ly_{B(Rr)}/Lx_{B(Rr)})$ X' axis: axis inclined from the X axis by $\beta-90°$ in the forward rotation direction Y' axis: axis inclined from the Y axis by $\beta-90°$ in the forward rotation direction $Lx'_{B(Fr)}$: X' coordinate value of the axis of the first balancer shaft=$(Lx_{B(Fr)}-Ly_{B(Fr)}/\tan\beta)\times\sin\beta$ $Ly'_B$: Y' coordinate value of the axis of the first balancer shaft and the second balancer shaft=$(Lx_{B(Fr)}+Ly_{B(Fr)}\times\tan\beta)\times\cos\beta$ $Lx'_{B(Rr)}$: X' coordinate value of the axis of the second balancer shaft=$(Lx_{B(Rr)}-Ly_{B(Rr)}/\tan\beta)\times\sin\beta$ $\theta_{Cr}$: angle of rotation of the crankshaft in the forward rotation direction (where $\theta_{Cr}$ is assumed to be 0° when the crank pin portion of the crankshaft is on the Y axis)

$U_P$: unbalance amount of the reciprocal movement portion=$m_P\times R$ (where $m_P$ is the mass of the reciprocal movement portion, and R is the crank radius)

$U_{Cr}$: unbalance amount of the rotary movement portion=$m_{Cr}\times r_{Cr}$ (where $m_{Cr}$ is the mass of the rotary movement portion, and $r_{Cr}$ is the distance between the axis of the crankshaft and the center of gravity of the rotary movement portion)

$\alpha_{Cr}$: unbalance direction (the angle in the forward rotation direction from the Y axis) of the rotary movement portion when $\theta_{Cr}=0°$ $U_{B(Fr)}$: unbalance amount of the first balancer shaft= $m_{B(Fr)} \times r_{B(Fr)}$ (where $m_{B(Fr)}$ is the mass of the first balancer shaft, and $r_{B(Fr)}$ is the distance between the axis of the first balancer shaft and the center of gravity of the first balancer shaft)

$U1_{B(Fr)}$: Y-axis direction component of the unbalance amount of the first balancer shaft ($=U_{B(Fr)}$) when $\theta_{Cr}=0°$ $U2_{B(Fr)}$: X-axis direction component of the unbalance amount of the first balancer shaft ($=U_{B(Fr)}$) when $\theta_{Cr}=0°$ $\alpha_{B(Fr)}$: unbalance direction (the angle in the forward rotation direction from the Y axis) of the first balancer shaft when $\theta_{Cr}=0°$ $U_{B(Rr)}$: unbalance amount of the second balancer shaft=$m_{B(Rr)} \times r_{B(Rr)}$ (where $m_{B(Rr)}$ is the mass of the second balancer shaft, and $r_{B(Rr)}$ is the distance between the axis of the second balancer shaft and the center of gravity of the second balancer shaft)

$U1_{B(Rr)}$: Y-axis direction component of the unbalance amount of the second balancer shaft ($=U_{B(Rr)}$) when $\theta_{Cr}=0°$ $U2_{B(Rr)}$: X-axis direction component of the unbalance amount of the second balancer shaft ($=U_{B(Rr)}$) when $\theta_{Cr}=0°$ $\alpha B_{(Rr)}$: unbalance direction (the angle in the forward rotation direction from the Y axis) of the second balancer shaft when $\theta_{Cr}=0°$ The reciprocating machine is configured so as to satisfy setting formulae below. In a method for designing the reciprocating machine according to the present invention, $U_{Cr}$, $\alpha_{Cr}$, $U_{B(Fr)}$, $U_{B(Rr)}$, $\alpha_{B(Fr)}$ and $\alpha_{B(Rr)}$ are set so as to satisfy setting formulae below:

$$U_{Cr}=U_P \times 0.5$$

$$\alpha_{Cr}=180°$$

$$U_{B(Fr)}=\{U1_{B(Fr)}^2+U2_{B(Fr)}^2\}^{1/2}$$

$$U1_{B(Fr)}=-U_P \times 0.5 \times \{Lx'_{B(Rr)}/(Lx'_{B(Rr)}-Lx'_{B(Fr)})\}$$

$$U2_{B(Fr)}=-U_P \times 0.5 \times \{Ly'_B/(Lx'_{B(Rr)}-Lx'_{B(Fr)})\}$$

$$\alpha_{B(Fr)}=180°-\arctan(U2_{B(Fr)}/U1_{B(Fr)})$$

$$U_{B(Rr)}=\{U1_{B(Rr)}^2+U2_{B(Rr)}^2\}^{1/2}$$

$$U1_{B(Rr)}=-U_P \times 0.5 \times \{Lx'_{B(Fr)}/(Lx'_{B(Fr)}-Lx'_{B(Rr)})\}$$

$$U2_{B(Rr)}=-U2_{B(Fr)}$$

$$\alpha_{B(Rr)}=180°-\arctan(U2_{B(Rr)}/U1_{B(Rr)}).$$

According to the reciprocating machine and the design method described above, in a reciprocating machine, wherein the axis of the crankshaft, the axis of the first balancer shaft and the axis of the second balancer shaft are not arranged on the same plane, the primary inertial force of the reciprocal movement portion, the centrifugal force generated by the rotary movement portion, the centrifugal force generated by the first balancer shaft and the centrifugal force generated by the second balancer shaft, which are generated by the operation of the reciprocating machine, are in balance with each other. Moreover, the moments generated due to difference between the line of action of the primary inertial force of the reciprocal movement portion, the line of action of the centrifugal force of the rotary movement portion, the line of action of the centrifugal force of the first balancer shaft and the line of action of the centrifugal force of the second balancer shaft are in balance with each other. Thus, it is possible to highly control the translational vibration caused by the primary inertial force and the centrifugal forces of the reciprocating machine, and the rotational vibration caused by the moments.

Another reciprocating machine according to the present invention is the reciprocating machine described above, wherein the center line of the cylinder is offset from the axis of the crankshaft as seen from the axial direction of the crankshaft. Another method for designing a reciprocating machine according to the present invention is a method for designing the other reciprocating machine.

Assume that the axis of the crankshaft is the origin, the axis extending from the origin toward the piston in parallel to the center line of the cylinder is the Y axis and the axis perpendicular to the Y axis is the X axis as seen from the axial direction of the crankshaft, and the rotation direction of the crankshaft is the forward rotation direction and the opposite direction to the rotation direction of the crankshaft is the reverse rotation direction as seen from the axial direction of the crankshaft, and assume that:

$Lx_{B(Fr)}$: X coordinate value of the axis of the first balancer shaft $Ly_{B(Fr)}$: Y coordinate value of the axis of the first balancer shaft $Lx_{B(Rr)}$: X coordinate value of the axis of the second balancer shaft $Ly_{B(Rr)}$: Y coordinate value of the axis of the second balancer shaft l distance between a connecting point between the conrod and the piston and a connecting point between the conrod and the crankshaft $\delta$: amount of offset of the cylinder $\beta$: angle, in the forward rotation direction, of the straight line connecting between the axis of the first balancer shaft and the axis of the second balancer shaft, from the Y axis, as seen from the axial direction of the crankshaft=90°+ $\arctan\{(Ly_{B(Rr)}-Ly_{B(Fr)})/(Lx_{B(Rr)}-Lx_{B(Fr)})\}$ $\gamma_{B(Fr)}$: angle, in the forward rotation direction, of the straight line connecting between the axis of the first balancer shaft and the axis of the crankshaft, from the Y axis, as seen from the axial direction of the crankshaft=90°+arctan $(Ly_{B(Fr)}/Lx_{B(Fr)})$ $\gamma_{B(Rr)}$: angle, in the forward rotation direction, of the straight line connecting between the axis of the second balancer shaft and the axis of the crankshaft, from the Y axis, as seen from the axial direction of the crankshaft=90°+ $\arctan(Ly_{B(Rr)}/Lx_{B(Rr)})$ X' axis: axis inclined from the X axis by $\beta-90°$ in the forward rotation direction Y' axis: axis inclined from the Y axis by $\beta-90°$ in the forward rotation direction $Lx'_{B(Fr)}$: X' coordinate value of the axis of the first balancer shaft=$(Lx_{B(Fr)}-Ly_{B(Fr)}/\tan\beta)\times\sin\beta$ $Ly'_B$: Y' coordinate value of the axis of the first balancer shaft and the second balancer shaft=$(Lx_{B(Fr)}+Ly_{B(Fr)}\times\tan\beta)\times\cos\beta$ $Lx'_{B(Rr)}$: X' coordinate value of the axis of the second balancer shaft=$(Lx_{B(Rr)}-Ly_{B(Rr)}/\tan\beta)\times\sin\beta$ $\theta_{Cr}$: angle of rotation of the crankshaft in the forward rotation direction (where $\theta_{Cr}$ is assumed to be 0° when the crank pin portion of the crankshaft is on the Y axis)

$U_P$: unbalance amount of the reciprocal movement portion=$m_P \times R$ (where $m_P$ is the mass of the reciprocal movement portion, and R is the crank radius)

$U_{Cr}$: unbalance amount of the rotary movement portion=$m_{Cr} \times r_{Cr}$ (where $m_{Cr}$ is the mass of the rotary movement portion, and $r_{Cr}$ is the distance between the axis of the crankshaft and the center of gravity of the rotary movement portion)

$\alpha_{Cr}$: unbalance direction (the angle in the forward rotation direction from the Y axis) of the rotary movement portion when $\theta_{Cr}=\arctan(\delta/l)°$ $U_{B(Fr)}$: unbalance amount of the first balancer shaft= $m_{B(Fr)} \times r_{B(Fr)}$ (where $m_{B(Fr)}$ is the mass of the first balancer shaft, and $r_{B(Fr)}$ is the distance between the axis of the first balancer shaft and the center of gravity of the first balancer shaft)

$U1_{B(Fr)}$: Y-axis direction component 1 of the unbalance amount of the first balancer shaft $(=U_{B(Fr)})$ when $\theta_{Cr}=\arctan(\delta/l)°$ $U2_{B(Fr)}$: X-axis direction component 1 of the unbalance amount of the first balancer shaft $(=U_{B(Fr)})$ when $\theta_{Cr}=\arctan(\delta/l)°$ $U3_{B(Fr)}$: Y-axis direction component 2 of the unbalance amount of the first balancer shaft $(=U_{B(Fr)})$ when $\theta_{Cr}=\arctan(\delta/l)°$ $U4_{B(Fr)}$: X-axis direction component 2 of the unbalance amount of the first balancer shaft $(=U_{B(Fr)})$ when $\theta_{Cr}=\arctan(\delta/l)°$ $\alpha_{B(Fr)}$: unbalance direction (the angle in the forward rotation direction from the Y axis) of the first balancer shaft when $\theta_{Cr}=\arctan(\delta/l)°$ $U_{B(Rr)}$: unbalance amount $=m_{B(Rr)} \times r_{B(Rr)}$ of the second balancer shaft (where $m_{B(Rr)}$ is the mass of the second balancer shaft, and $r_{B(Rr)}$ is the distance between the axis of the second balancer shaft and the center of gravity of the second balancer shaft)

$U1_{B(Rr)}$: Y-axis direction component 1 of the unbalance amount of the second balancer shaft $(=U_{B(Rr)})$ when $\theta_{Cr}=\arctan(\delta/l)°$ $U2_{B(Rr)}$: X-axis direction component 1 of the unbalance amount of the second balancer shaft $(=U_{B(Rr)})$ when $\theta_{Cr}=\arctan(\delta/l)°$ $U3_{B(Rr)}$: Y-axis direction component 2 of the unbalance amount of the second balancer shaft $(=U_{B(Rr)})$ when $\theta_{Cr}=\arctan(\delta/l)°$ $U4_{B(Rr)}$: X-axis direction component 2 of the unbalance amount of the second balancer shaft $(=U_{B(Rr)})$ when $\theta_{Cr}=\arctan(\delta/l)°$ $\alpha_{B(Rr)}$: unbalance direction (the angle in the forward rotation direction from the Y axis) of the second balancer shaft when $\theta_{Cr}=\arctan(\delta/l)°$.

Another reciprocating machine according to the present invention is configured so as to satisfy setting formulae below. In a method for designing the other reciprocating machine according to the present invention, $U_{Cr}$, $\alpha_{Cr}$, $U_{B(Fr)}$, $U_{B(Rr)}$, $\alpha_{B(Fr)}$ and $\alpha_{B(Rr)}$ are set so as to satisfy setting formulae below:

$$U_{Cr}=U_P \times 0.5 \times \{1+(\delta/l)^2\}^{1/2}$$

$$\alpha_{Cr}=180°-\arctan(\delta/l)$$

$$U_{B(Fr)}=\{(U1_{B(Fr)}+U3_{B(Fr)})^2+(U2_{B(Fr)}+U4_{B(Fr)})^2\}^{1/2}$$

$$U1_{B(Fr)}=-U_P \times 0.5 \times \{Lx'_{B(Rr)}/(Lx'_{B(Rr)}-Lx'_{B(Fr)})\} \times \{1+(\delta/l)^2\}^{1/2}$$

$$U2_{B(Fr)}=-U_P \times 0.5 \times \{Ly'_{B}/(Lx'_{B(Rr)}-Lx_{B(Fr)})\} \times \{1+(\delta/l)^2\}^{1/2}$$

$$U3_{B(Fr)}=-U_P \times \{\delta/(Lx'_{B(Rr)}-Lx'_{B(Fr)})\} \times \sin \beta \times \{1+(\delta/l)^2\}^{1/2}$$

$$U4_{B(Fr)}=-U_P \{\delta/(Lx'_{B(Rr)}-Lx_{B(Fr)})\} \times \cos \beta \times \{1+(\delta/l)^2\}^{1/2}$$

$$\alpha_{B(Fr)}=180°-\arctan \{(U2_{B(Fr)}+U4_{B(Fr)})/(U1_{B(Fr)}+U3_{B(Fr)})\}+\arctan(\delta/l)$$

$$U_{B(Rr)}\{(U1_{B(Rr)}+U3_{B(Rr)})^2+(U2_{B(Rr)}+U4_{B(Rr)})^2\}^{1/2}$$

$$U1_{B(Rr)}=-U_P \times 0.5 \times \{Lx'_{B(Fr)}/(Lx'_{B(Fr)}-Lx'_{B(Rr)})\} \times \{1+(\delta/l)^2\}^{1/2}$$

$$U2_{B(Rr)}=-U2_{B(Fr)}$$

$$U3_{B(Rr)}=-U3_{B(Fr)}$$

$$U4_{B(Rr)}=-U4_{B(Fr)}$$

$$\alpha_{B(Rr)}=180°-\arctan \{(U2_{B(Rr)}+U4_{B(Rr)})/(U1_{B(Rr)}+U3_{B(Rr)})\}+\arctan(\delta/l).$$

According to the reciprocating machine and the design method described above, in a reciprocating machine wherein the axis of the crankshaft, the axis of the first balancer shaft and the axis of the second balancer shaft are not arranged on the same plane, and wherein the center line of the cylinder is offset from the axis of the crankshaft, the primary inertial force of the reciprocal movement portion, the centrifugal force generated by the rotary movement portion, the centrifugal force generated by the first balancer shaft and the centrifugal force generated by the second balancer shaft, which are generated by the operation of the reciprocating machine, are in balance with each other. Moreover, the moments generated due to difference between the line of action of the primary inertial force of the reciprocal movement portion, the line of action of the centrifugal force of the rotary movement portion, the line of action of the centrifugal force of the first balancer shaft and the line of action of the centrifugal force of the second balancer shaft are in balance with each other. Thus, it is possible to highly control the translational vibration caused by the primary inertial force and the centrifugal forces of the reciprocating machine, and the rotational vibration caused by the moments.

According to one embodiment of the present invention, the reciprocating machine is a multi-cylinder internal combustion engine, wherein each cylinder is configured so as to satisfy the setting formulae above.

According to the embodiment described above, since vibration is controlled for each cylinder, it is possible to control the overall vibration of the internal combustion engine without particularly taking into consideration the relationship between cylinders.

According to another embodiment of the present invention, the reciprocating machine is an internal combustion engine installed on a motorcycle.

According to the embodiment described above, there is little limitation on the layout of the internal combustion engine because the axis of the crankshaft, the axis of the first balancer shaft and the axis of the second balancer shaft do not need to be arranged on the same plane. The first balancer shaft and the second balancer shaft can be arranged relatively freely. For example, the first balancer shaft and the second balancer shaft can be arranged so as to make the internal combustion engine compact. An internal combustion engine for a motorcycle is required to have a high level of compactness. Therefore, the internal combustion engine described above can be desirably used as an internal combustion engine for a motorcycle.

According to another embodiment of the present invention, the crankshaft, the first balancer shaft and the second balancer shaft each extend in the vehicle width direction of the motorcycle, the first balancer shaft is arranged forward of the crankshaft and the second balancer shaft is arranged rearward of the crankshaft.

According to the embodiment described above, it is possible to obtain an internal combustion engine suitable as an internal combustion engine for a motorcycle.

According to another embodiment of the present invention, the machine includes a main shaft extending in a vehicle width direction and linked to the crankshaft, and a drive shaft extending in the vehicle width direction and linked to the main shaft via a transmission. An axis of the drive shaft is arranged rearward of an axis of the crankshaft. An axis of the main shaft is arranged rearward of and above the axis of the crankshaft and forward of and above the axis of the drive shaft. The axis of the first balancer shaft is arranged forward of and below the axis of the crankshaft. The axis of the second balancer shaft is arranged rearward of and above the axis of the crankshaft and forward of the axis of the main shaft.

According to the embodiment described above, the crankshaft, the main shaft, the drive shaft, the first balancer shaft and the second balancer shaft are arranged as described above, and it is therefore possible to make the internal combustion engine compact.

According to the present invention, in a reciprocating machine, wherein the axis of the crankshaft, the axis of the first balancer shaft and the axis of the second balancer shaft are not arranged on the same plane, it is possible to highly control the translational vibration and the rotational vibration, which are generated by the operation of the reciprocating machine.

BRIEF DESCRIPTION OF DRAWINGS

FIG. 9 is a table showing simulation results of Example 1.

FIG. 10 is a table showing simulation results of Example 2.

DESCRIPTION OF EMBODIMENTS

First Embodiment

Figure 1:
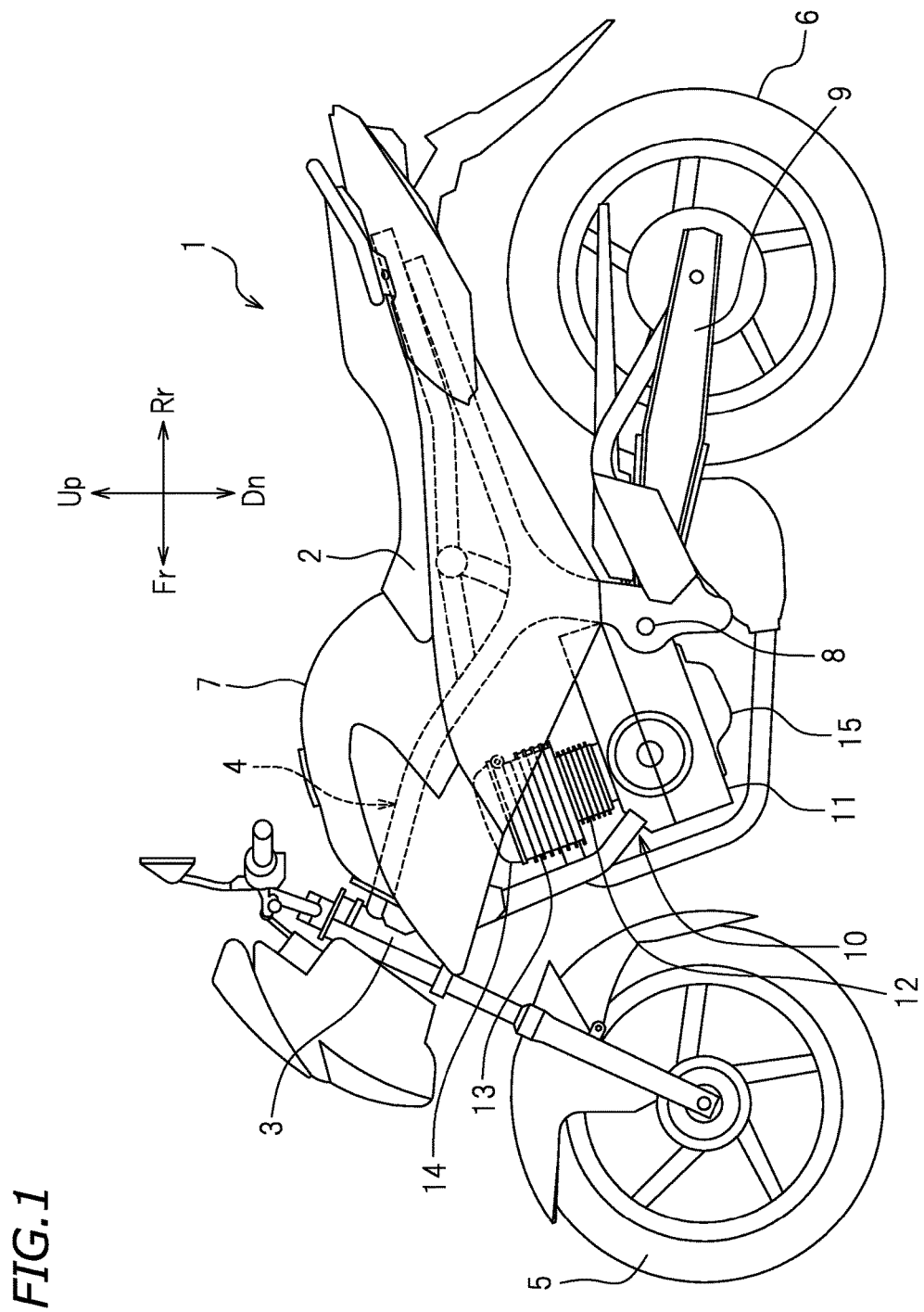
FIG. 1 is a side view of a motorcycle including an engine as a reciprocating machine according to an embodiment of the present invention.

An embodiment of the present invention will now be described. A reciprocating machine of the present embodiment is a vehicle engine installed on a vehicle. Although there is no particular limitation on the type of the vehicle, it is a straddled vehicle, for example. A straddled vehicle is a vehicle that a passenger straddles. As shown in FIG. 1, the straddled vehicle of the present embodiment is a motorcycle 1. There is no particular limitation on the type of the motorcycle 1, which may be a motorcycle of a scooter type, a moped type, an off-road type or an on-road type. The straddled vehicle is not limited to a motorcycle, but may be an ATV (All Terrain Vehicle), a four-wheel buggy, or the like. Note that the reciprocating machine of the present invention is not limited to a vehicle engine. The present invention is applicable to any machine having a reciprocating slider crank mechanism, such as an internal combustion engine, a reciprocating pump or a reciprocating gas compressor.

The terms front, rear, left, right, up and down, as used in the description below, refer to these directions as seen from a passenger seated in a seat 2 of the motorcycle 1, unless specified otherwise. The terms up and down refer to these directions in the vertical direction while the motorcycle 1 is stationary on a horizontal surface. The designations Fr, Rr, L, R, Up and Dn, as used in the figures, refer to front, rear, left, right, up and down, respectively.

As shown in FIG. 1, the motorcycle 1 includes a head pipe 3, a vehicle body frame 4 fixed on the head pipe 3, a front wheel 5 and a rear wheel 6. A fuel tank 7 is arranged rearward of the head pipe 3. A seat 2 is arranged rearward of the fuel tank 7. The front end portion of a rear arm 9 is connected, via a pivot shaft 8, to the rear portion of the vehicle body frame 4. The rear wheel 6 is rotatably supported on the rear end portion of the rear arm 9.

The motorcycle 1 includes an engine 10, which is an example reciprocating machine. The engine 10 is unswingably supported on the vehicle body frame 4. The engine 10 includes a crankcase 11, a cylinder body 12 extending upward from the crankcase 11, a cylinder head 13 connected to the top of the cylinder body 12, and a cylinder head cover 14 connected to the top of the cylinder head 13. An oil pan 15 is arranged under the crankcase 11.

Figure 2:
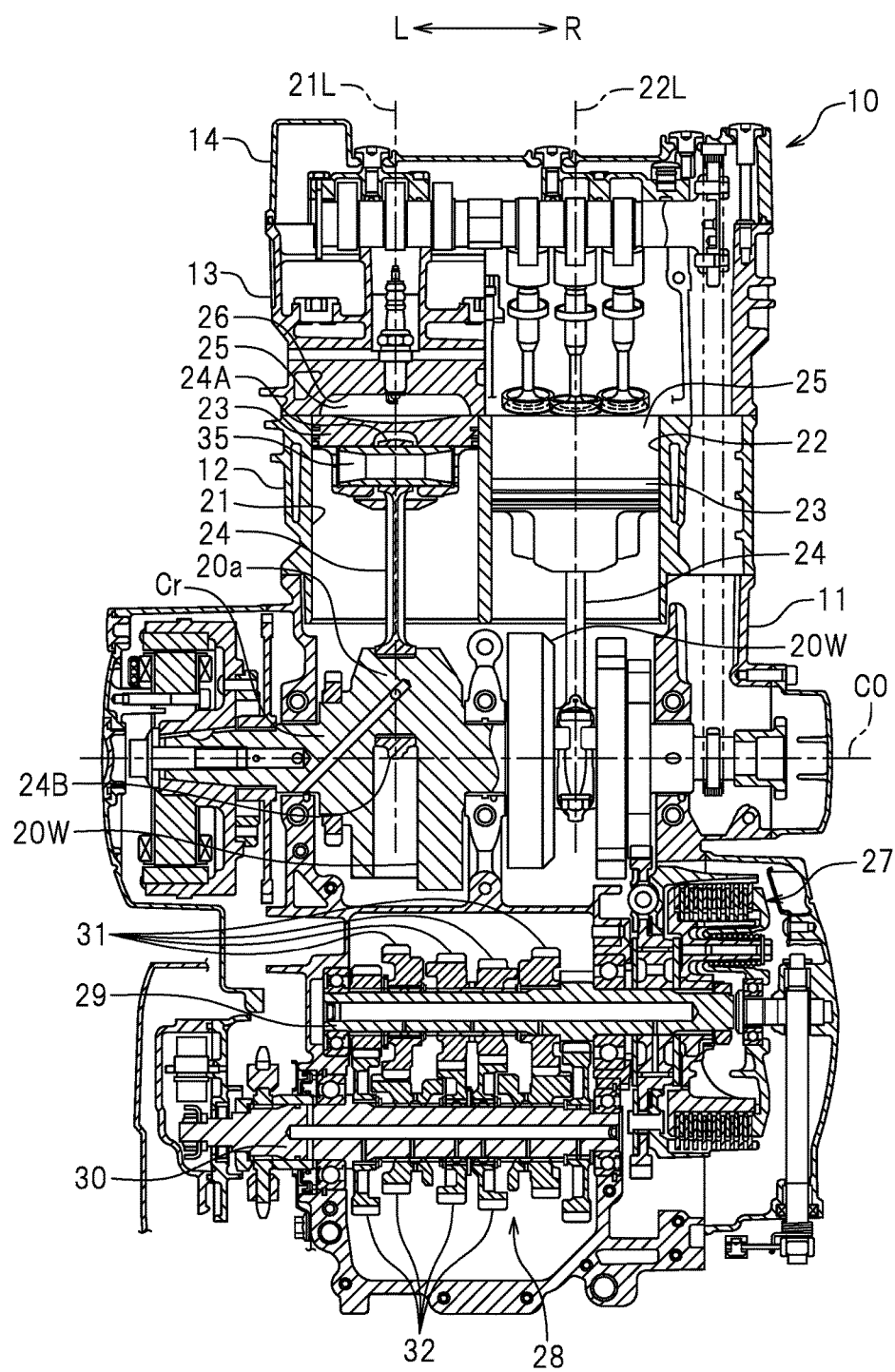
FIG. 2 is a cross-sectional view of the engine.

As shown in FIG. 2, a crankshaft Cr is arranged inside the crankcase 11. The crankshaft Cr extends in the vehicle left-right direction. In other words, the crankshaft Cr extends in the vehicle width direction. A first cylinder 21 and a second cylinder 22 are provided inside the cylinder body 12. The first cylinder 21 and the second cylinder 22 extend upward from a front portion of the crankcase 11. A piston 23 is accommodated in each of the first cylinder 21 and the second cylinder 22. Each piston 23 is connected to the crankshaft Cr via a conrod 24. A small end portion 24A, which is one end portion of the conrod 24, is connected to the piston 23 by a piston pin 35. The crankshaft Cr includes a crank pin portion 20a, and a big end portion 24B, which is the other end portion of the conrod 24, is connected to the crank pin portion 20a. The engine 10 of the present embodiment is a two-cylinder engine including the two cylinders 21 and 22. However, the engine 10 may be a single-cylinder engine including one cylinder. The engine 10 may be a multi-cylinder engine including three or more cylinders. The upper surface of the piston 23, the inner peripheral surface of the cylinders 21 and 22 and a depression 26 of the cylinder head 13 together define a combustion chamber 25.

A clutch 27 and a transmission 28 are arranged inside the crankcase 11. The clutch 27 is linked to a main shaft 29. The transmission 28 includes a plurality of gears 31 provided on the main shaft 29, and a plurality of gears 32 provided on a drive shaft 30. The main shaft 29 and the drive shaft 30 extend in the vehicle left-right direction.

Figure 3:
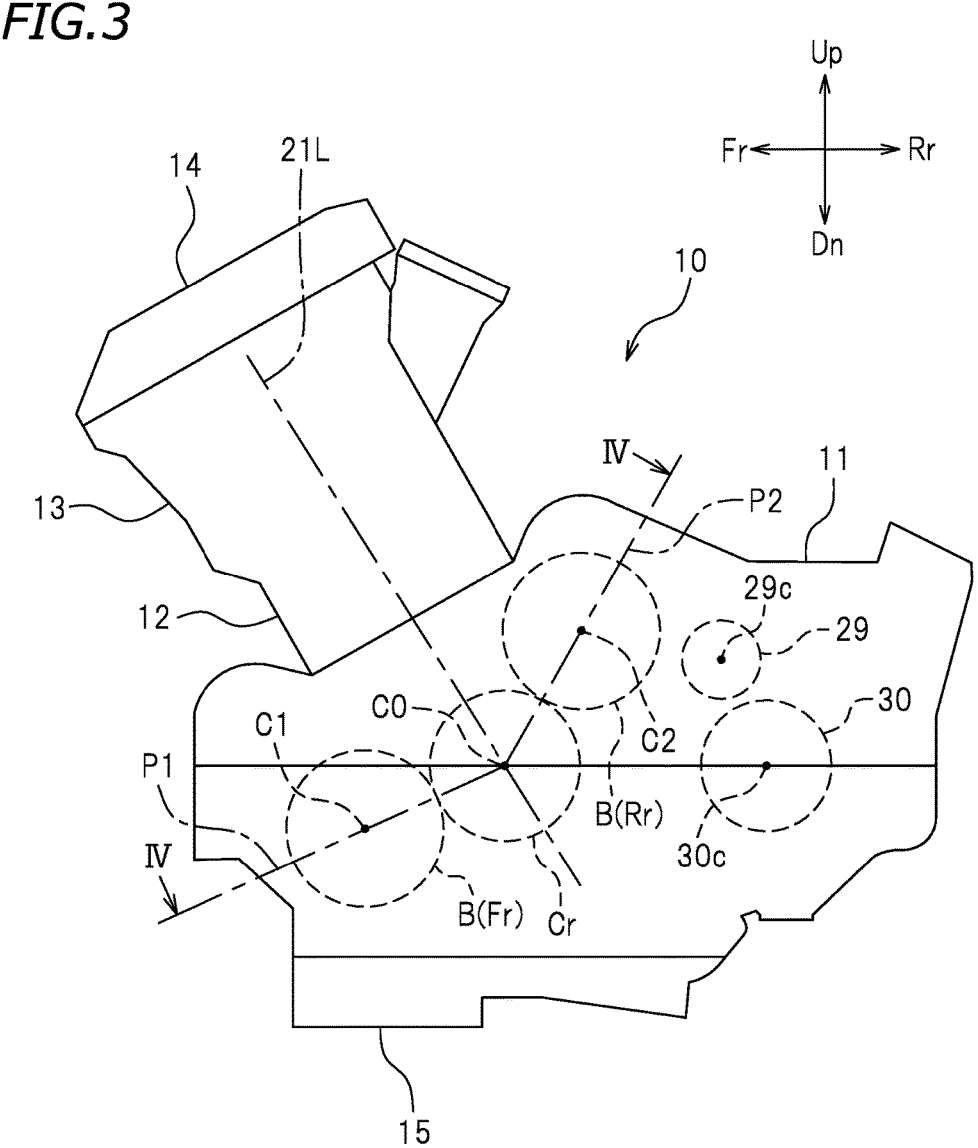
FIG. 3 is a side view schematically showing the engine.

FIG. 3 is a schematic view of the engine 10 as seen from the side of the vehicle. As shown in FIG. 3, the main shaft 29 and the drive shaft 30 are arranged rearward of the crankshaft Cr. An axis 29c of the main shaft 29 is arranged above an axis 30c of the drive shaft 30. The axis 29c of the main shaft 29 is arranged forward of the axis 30c of the drive shaft 30. The engine 10 includes a first balancer shaft $B_{(Fr)}$ and a second balancer shaft $B_{(Rr)}$. An axis C1 of the first balancer shaft $B_{(Fr)}$ is arranged forward of an axis C2 of the second balancer shaft $B_{(Rr)}$. The axis C1 of the first balancer shaft $B_{(Fr)}$ is arranged below the axis C2 of the second balancer shaft $B_{(Rr)}$. An axis C0 of the crankshaft Cr is arranged rearward of the axis C1 of the first balancer shaft $B_{(Fr)}$ and forward of the axis C2 of the second balancer shaft $B_{(Rr)}$. The axis C0 of the crankshaft Cr is arranged above the axis C1 of the first balancer shaft $B_{(Fr)}$ and below the axis C2 of the second balancer shaft $B_{(Rr)}$. The plane P1 containing the axis C0 of the crankshaft Cr and the axis C1 of the first balancer shaft $B_{(Fr)}$ and the plane P2 containing the axis C0 of the crankshaft Cr and the axis C2 of the second balancer shaft $B_{(Rr)}$ cross each other. The plane P1 and the plane P2 are different planes from each other. The axis C0 of the crankshaft Cr, the axis C1 of the first balancer shaft $B_{(Fr)}$ and the axis C2 of the second balancer shaft $B_{(Rr)}$ are not arranged on the same plane.

Figure 4:
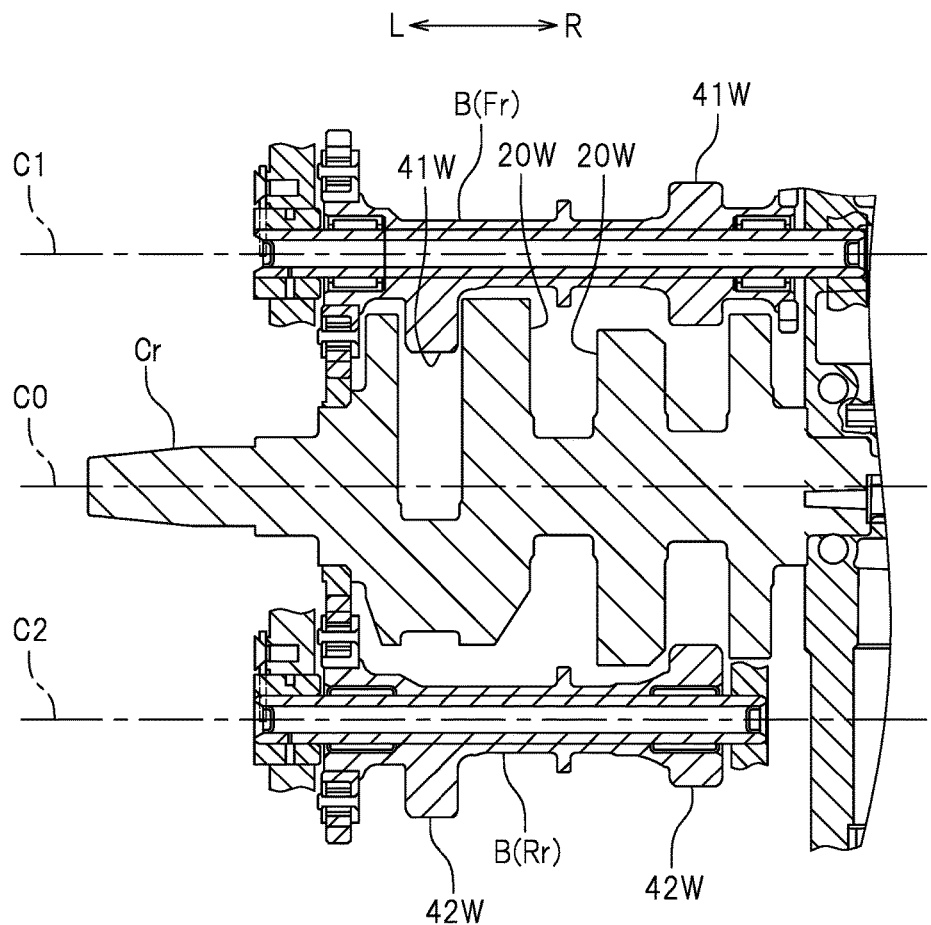
FIG. 4 is a cross-sectional view showing a part of the internal configuration of the engine.

As shown in FIG. 2, the crankshaft Cr includes two sets of crank webs 20W corresponding to two pistons 23. As shown in FIG. 4, the first balancer shaft $B_{(Fr)}$ includes two balancer weights 41W corresponding to two pistons 23. The second balancer shaft $B_{(Rr)}$ also includes two balancer weights 42W corresponding to two pistons 23.

(Settings of First Balancer Shaft and Second Balancer Shaft)

Next, a method for setting the first balancer shaft $B_{(Fr)}$ and the second balancer shaft $B_{(Rr)}$ will be described. In the following description, the piston 23, the piston pin 35 and the small end portion 24A of the conrod 24 will be referred to collectively as the "reciprocal movement portion". The crankshaft Cr and the big end portion 24B of the conrod 24 will be referred to collectively as the "rotary movement portion". The small end portion 24A of the conrod 24 refers to an end portion of the conrod 24 that is connected to the piston 23. The big end portion 24B of the conrod 24 refers to an end portion of the conrod 24 that is connected to the crank pin portion 20a of the crankshaft Cr (see FIG. 2), i.e., an end portion that is opposite to the small end portion 24A. In the present embodiment, for each of the cylinders 21 and 22, the reciprocal movement portion, the rotary movement portion, the first balancer shaft $B_{(Fr)}$ and the second balancer shaft $B_{(Rr)}$ are in balance with each other. That is, for the first cylinder 21, the reciprocal movement portion, the rotary movement portion, the first balancer shaft $B_{(Fr)}$ and the second balancer shaft $B_{(Rr)}$ are in balance with each other. For the second cylinder 22, the reciprocal movement portion, the rotary movement portion, the first balancer shaft $B_{(Fr)}$ and the second balancer shaft $B_{(Rr)}$ are in balance with each other. In view of this, the following description will be directed only to the first cylinder 21, and the description of the second cylinder 22 will be omitted.

In order to highly control the translational vibration and the rotational vibration of the engine 10, there is a need to ensure balance between the primary inertial force of the reciprocal movement portion, the centrifugal force of the rotary movement portion, the centrifugal force of the first balancer shaft $B_{(Fr)}$ and the centrifugal force of the second balancer shaft $B_{(Rr)}$ at any rotation angle of the crankshaft Cr, and to ensure balance between moments that are generated due to difference between lines of action of the primary inertial force of the reciprocal movement portion, the centrifugal force of the rotary movement portion, the centrifugal force of the first balancer shaft $B_{(Fr)}$ and the centrifugal force of the second balancer shaft $B_{(Rr)}$.

Figure 5:
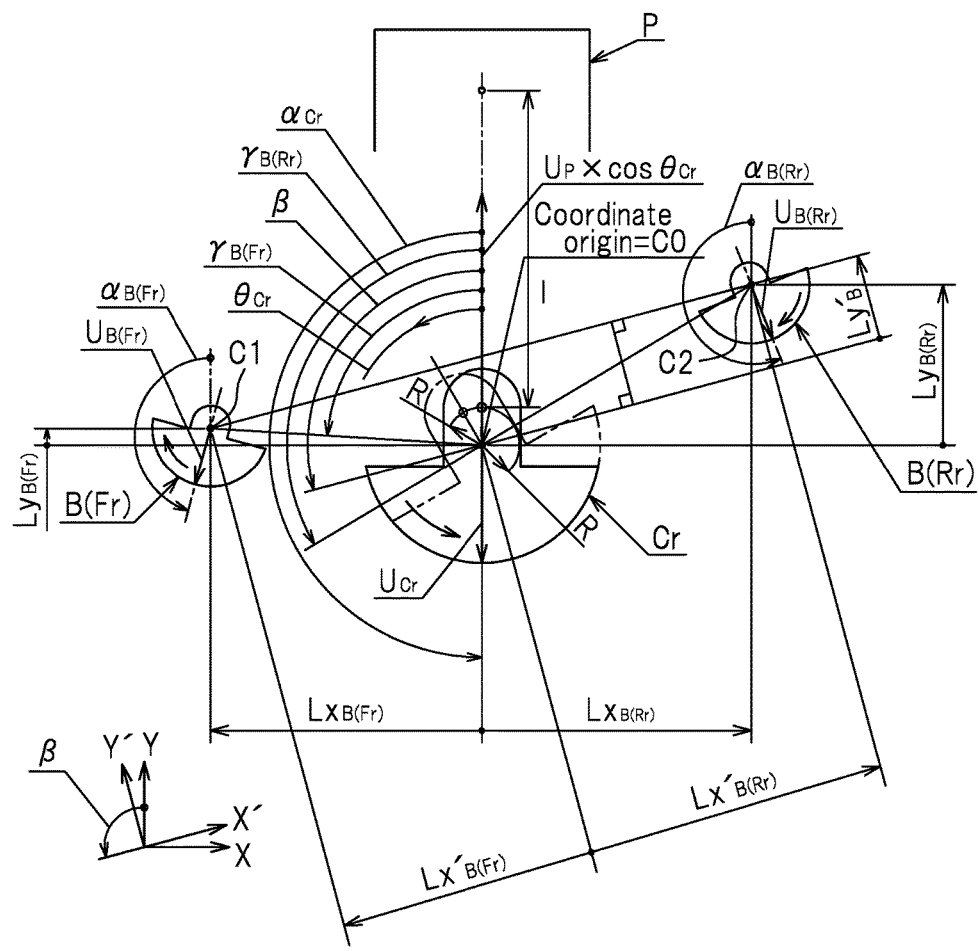
FIG. 5 is a view illustrating denotations used in the first embodiment.

The following denotations will be used in the description below (see FIG. 5). Assume that the axis C0 of the crankshaft Cr is the origin, the axis extending from the origin toward the piston 23 in parallel to the center line 21L of the cylinder 21 is the Y axis and the axis perpendicular to the Y axis is the X axis as seen from the axial direction of the crankshaft Cr. Assume that the rotation direction of the crankshaft Cr is the forward rotation direction and the opposite direction to the rotation direction of the crankshaft Cr is the reverse rotation direction as seen from the axial direction of the crankshaft Cr.

P: reciprocal movement portion

Cr: crankshaft $B_{(Fr)}$: first balancer shaft $B_{(Rr)}$: second balancer shaft $Lx_{B(Fr)}$: X coordinate value of the axis of the first balancer shaft $Ly_{B(Fr)}$: Y coordinate value of the axis of the first balancer shaft $Lx_{B(Rr)}$: X coordinate value of the axis of the second balancer shaft $Ly_{B(Rr)}$: Y coordinate value of the axis of the second balancer shaft $\beta$: angle, in the forward rotation direction, of the straight line connecting between the axis of the first balancer shaft and the axis of the second balancer shaft, from the Y axis, as seen from the axial direction of the crankshaft=$90°+\arctan\{(Ly_{B(Rr)}-Ly_{B(Fr)})/(Lx_{B(Rr)}-Lx_{B(Fr)})\}$ $\gamma_{B(Fr)}$: angle, in the forward rotation direction, of the straight line connecting between the axis of the first balancer shaft and the axis of the crankshaft, from the Y axis, as seen from the axial direction of the crankshaft=$90°+\arctan(Ly_{B(Fr)}/Lx_{B(Fr)})$ $\gamma_{B(Rr)}$: angle, in the forward rotation direction, of the straight line connecting between the axis of the second balancer shaft and the axis of the crankshaft, from the Y axis, as seen from the axial direction of the crankshaft=$90°+\arctan(Ly_{B(Rr)}/Lx_{B(Rr)})$ X' axis: axis inclined from the X axis by $\beta-90°$ in the forward rotation direction Y' axis: axis inclined from the Y axis by $\beta-90°$ in the forward rotation direction $Lx'_{B(Fr)}$: X' coordinate value of the axis of the first balancer shaft=$(Lx_{B(Fr)}-Ly_{B(Fr)}/\tan\beta)\times\sin\beta$ $Ly'_{B}$: Y' coordinate value of the axis of the first balancer shaft and the second balancer shaft=$(Lx_{B(Fr)}+Ly_{B(Fr)}\times\tan\beta)\times\cos\beta$ $Lx'_{B(Rr)}$: X' coordinate value of the axis of the second balancer shaft=$(Lx_{B(Rr)}-Ly_{B(Rr)}/\tan\beta)\times\sin\beta$ $\theta_{Cr}$: rotation angle of the crankshaft in the forward rotation direction (where $\theta_{Cr}$ is assumed to be 0° when the crank pin portion of the crankshaft is on the Y axis)

$U_P$: unbalance amount of the reciprocal movement portion=$m_P\times R$ (where $m_P$ is the mass of the reciprocal movement portion, and R is the crank radius)

$U_{Cr}$: unbalance amount of the rotary movement portion=$m_{Cr}\times r_{Cr}$ (where $m_{Cr}$ is the mass of the rotary movement portion, and $r_{Cr}$ is the distance between the axis of the crankshaft and the center of gravity of the rotary movement portion)

$\alpha_{Cr}$: unbalance direction (the angle in the forward rotation direction from the Y axis) of the rotary movement portion when $\theta_{Cr}=0°$ $U_{B(Fr)}$: unbalance amount of the first balancer shaft=$m_{B(Fr)}\times r_{B(Fr)}$ (where $m_{B(Fr)}$ is the mass of the first balancer shaft, and $r_{B(Fr)}$ is the distance between the axis of the first balancer shaft and the center of gravity of the first balancer shaft)

$U1_{B(Fr)}$: Y-axis direction component of the unbalance amount of the first balancer shaft ($=U_{B(Fr)}$) when $\theta_{Cr}=0°$ $U2_{B(Fr)}$: X-axis direction component of the unbalance amount of the first balancer shaft ($=U_{B(Fr)}$) when $\theta_{Cr}=0°$ $\alpha_{B(Fr)}$: unbalance direction (the angle in the forward rotation direction from the Y axis) of the first balancer shaft when $\theta_{Cr}=0°$ $U_{B(Rr)}$: unbalance amount of the second balancer shaft=$m_{B(Rr)} \times r_{B(Rr)}$ (where $m_{B(Rr)}$ is the mass of the second balancer shaft, and $r_{B(Rr)}$ is the distance between the axis of the second balancer shaft and the center of gravity of the second balancer shaft)

$U1_{B(Rr)}$: Y-axis direction component of the unbalance amount of the second balancer shaft ($=U_{B(Rr)}$) when $\theta_{Cr}=0°$ $U2_{B(Rr)}$: X-axis direction component of the unbalance amount of the second balancer shaft ($=U_{B(Rr)}$) when $\theta_{Cr}=0°$ $\alpha_{B(Rr)}$: unbalance direction (the angle in the forward rotation direction from the Y axis) of the second balancer shaft when $\theta_{Cr}=0°$ Herein, the X' axis and the Y' axis are coordinates that are newly introduced by the present inventors for the design process to be described below and that have not been used in the conventional design processes. The X'-Y' coordinates are used as follows.

Figure 6:
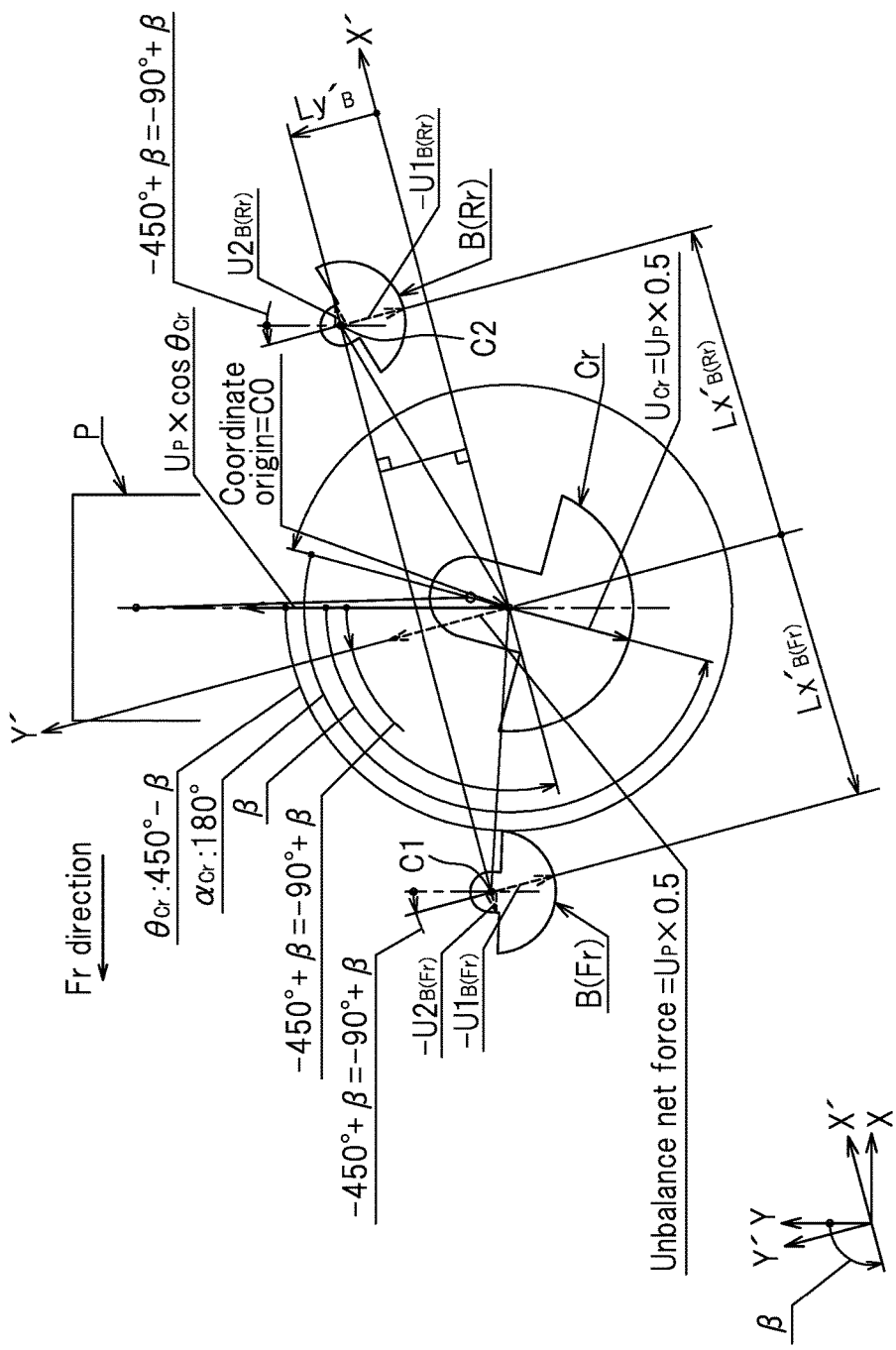
FIG. 6 is a view illustrating one operational state of the first embodiment.

First, consider a state where the direction of the net force between the primary inertial force of the reciprocal movement portion and the centrifugal force of the rotary movement portion (hereinafter referred to as the "unbalance net force") is the Y'-axis positive direction (see FIG. 6). Note that a state where the direction of the unbalance net force is the Y'-axis negative direction will not be described below, but the discussion below similarly applies to such a state.

(1) Where "$U_{Cr}=U_P \times 0.5$" and "$\alpha_{Cr}=180°$", the magnitude of the unbalance net force when $\theta_{Cr}=a°$ is $U_P \times 0.5$. The direction thereof is $-a°$.

(2) From (1) above, the direction of the unbalance net force is $-90°+\beta$. That is, the unbalance net force acts in the Y'-axis positive direction. Also, $\theta_{Cr}=450°-\beta$.

(3) $U1_{B(Fr)}$, $U1_{B(Rr)}$ is the Y-axis direction component of the unbalance amount of the first, second balancer shaft when $\theta\theta_{Cr}=0°$. Therefore, in this state, the direction of the centrifugal force caused by $U1_{B(Fr)}$, $U1_{B(Rr)}$ is $90°+\beta$. Note that when the sign of $U1_{B(Fr)}$, $U1_{B(Rr)}$ is negative, the centrifugal force acts in the Y'-axis negative direction.

(4) $U1_{B(Fr)}$ and $U1_{B(Rr)}$ are set so that the centrifugal force caused by $U1_{B(Fr)}$+the centrifugal force caused by $U1_{B(Rr)}$=−unbalance net force and so that $U1_{B(Fr)}:U1_{B(Rr)}=Lx'_{B(Rr)}:-Lx'_{B(Fr)}$.

(5) From (2), (3) and (4) above, the unbalance net force, the centrifugal force caused by $U1_{B(Fr)}$ and the centrifugal force caused by $U1_{B(Rr)}$ are in balance with each other. Moreover, the moments are also in balance with each other.

(6) $U2_{B(Fr)}$, $U2_{B(Rr)}$ is the X-axis direction component of the unbalance amount of the first, second balancer shaft when $\theta_{Cr}=0°$. Therefore, in this state, the direction of the centrifugal force caused by $U2_{B(Fr)}$, $U2_{B(Rr)}$ is $180°+\beta$. Note that when the sign of $U2_{B(Fr)}$, $U2_{B(Rr)}$ is negative, the centrifugal force acts in the X'-axis negative direction.

(7) $U2_{B(Fr)}$ and $U2_{B(Rr)}$ are set so that $U2_{B(Fr)}=-U2_{B(Rr)}$ (Note that the values of $U2_{B(Fr)}$ and $U2_{B(Rr)}$ will be described below).

(8) From (6) and (7) above, the centrifugal force caused by $U2_{B(Fr)}$ and the centrifugal force caused by $U2_{B(Rr)}$ in this state have their lines of action aligned on a single straight line and are acting in the opposite directions with an equal magnitude, and they are therefore canceling each other.

(9) From (1) and (4) above, $U1_{B(Rr)}=-U_P \times 0.5 - U1_{B(Fr)}$.

(10) From (4) above, $U1_{B(Rr)}=U1_{B(Fr)} \times -Lx'_{B(Fr)}/Lx'_{B(Rr)}$.

(11) Substituting Expression (9) above into Expression (10) above yields $-U_P \times 0.5 - U1_{B(Fr)} = U1_{B(Fr)} \times -Lx'_{B(Fr)}/Lx'_{B(Rr)}$. This can be rearranged into $U1_{B(Fr)} = -U_P \times 0.5 \times \{Lx'_{B(Rr)}/(Lx'_{B(Rr)} - Lx'_{B(Fr)})\}$.

(12) Similar to (14) above, $U1_{B(Rr)} = -U_P \times 0.5 \times \{Lx'_{B(Fr)}/(Lx'_{B(Fr)} - Lx'_{B(Rr)})\}$.

(13) Thus, this state is where the primary inertial force of the reciprocal movement portion of the engine 10, the centrifugal force generated by the rotary movement portion, the centrifugal force generated by the first balancer shaft and the centrifugal force generated by the second balancer shaft are in balance with each other, and where the moments generated due to difference between lines of action of the primary inertial force of the reciprocal movement portion, the centrifugal force of the rotary movement portion, the centrifugal force of the first balancer shaft and the centrifugal force of the second balancer shaft are in balance with each other.

Figure 7:
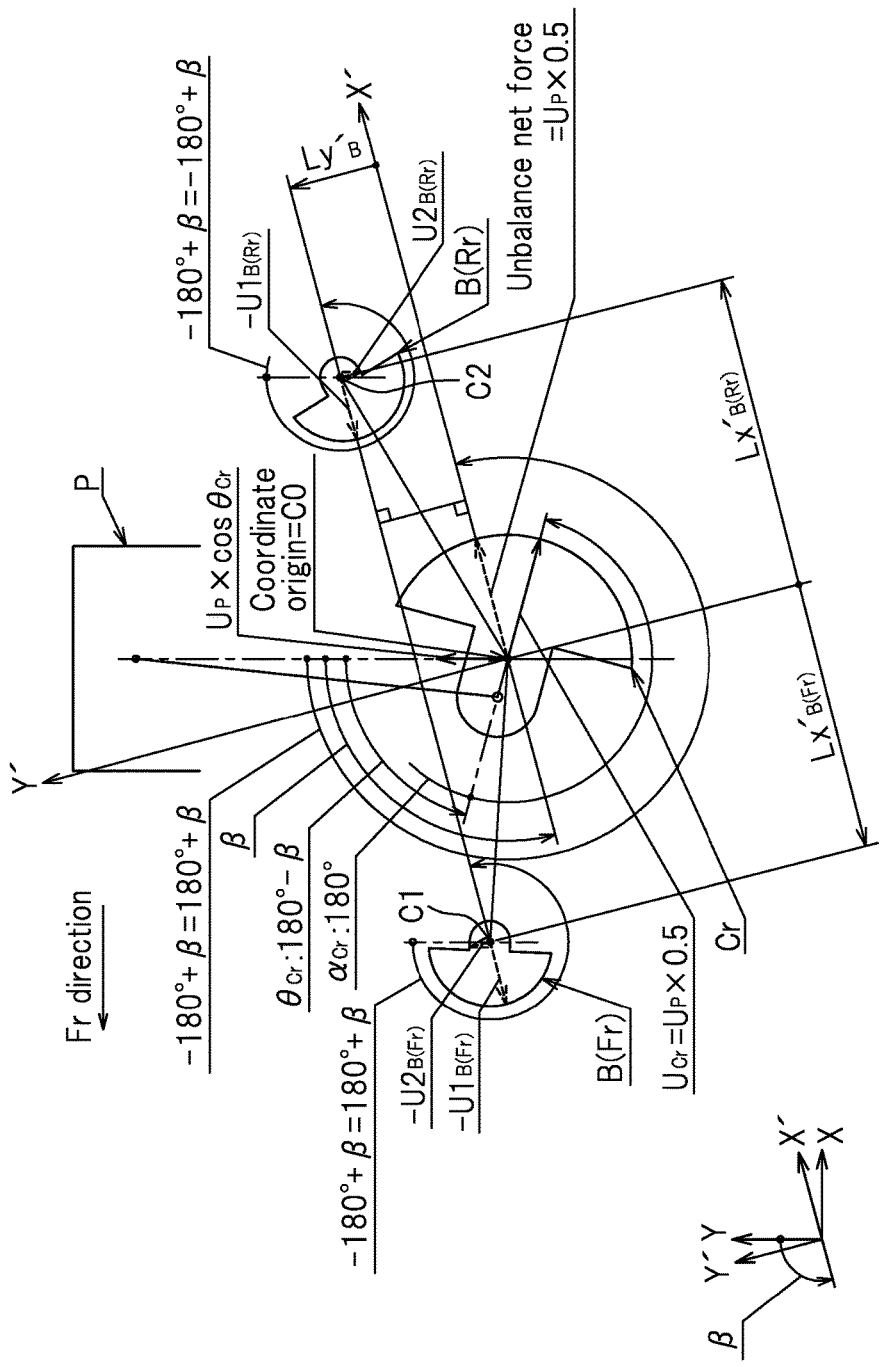
FIG. 7 is a view illustrating another operational state of the first embodiment.

Next, consider a state where the direction of the unbalance net force is the X'-axis positive direction (see FIG. 7). Note that a state where the direction of the unbalance net force is the X'-axis negative direction will not be described below, but the discussion below similarly applies to such a state.

(1) As in the case above, where "$U_{Cr}=U_P \times 0.5$" and "$\alpha_{Cr}=180°$", the magnitude of the unbalance net force when $\theta_{Cr}=a°$ is $U_P \times 0.5$. The direction thereof is $-a°$.

(2) From (1) above, the direction of the unbalance net force is $180°+\beta$. That is, the unbalance net force acts in the X'-axis positive direction. Also, $\theta_{Cr}=180°-\beta$.

(3) $U1_{B(Fr)}$, $U1_{B(Rr)}$ is the Y-axis direction component of the unbalance amount of the first, second balancer shaft when $\theta_{Cr}=0°$. Therefore, in this state, the direction of the centrifugal force caused by $U1_{B(Fr)}$, $U1_{B(Rr)}$ is $180°+\beta$. Note that when the sign of $U1_{B(Fr)}$, $U1_{B(Rr)}$ is negative, the centrifugal force acts in the X'-axis negative direction.

(4) As in the case above, the centrifugal force caused by $U1_{B(Fr)}$+the centrifugal force caused by $U1_{B(Rr)}=-$unbalance net force.

(5) From (2), (3) and (4) above, the unbalance net force, the centrifugal force caused by $U1_{B(Fr)}$ and the centrifugal force caused by $U1_{B(Rr)}$ are in balance with each other. However, since the lines of action are not aligned on a single straight line, the moments are not in balance with each other.

(6) $U2_{B(Fr)}$, $U2_{B(Rr)}$ is the X-axis direction component of the unbalance amount of the first, second balancer shaft when $\theta_{Cr}=0°$. Therefore, in this state, the direction of the centrifugal force caused by $U2_{B(Fr)}$, $U2_{B(Rr)}$ is $90°+\beta$. Note that when the sign of $U2_{B(Fr)}$, $U2_{B(Rr)}$ is negative, the centrifugal force acts in the Y'-axis positive direction.

(7) As in the case above, $U2_{B(Rr)}=-U2_{B(Fr)}$.

(8) From (6) and (7) above, the centrifugal force caused by $U2_{B(Fr)}$ and the centrifugal force caused by $U2_{B(Rr)}$ in this state are acting in the opposite directions with an equal magnitude, and they are therefore in balance with each other. However, since the lines of action are not aligned on a single straight line, the moments are not in balance with each other.

(9) The distance from the origin to the line of action of the centrifugal force caused by $U1_{B(Fr)}$ and that of the centrifugal force caused by $U1_{B(Rr)}$ is $Ly'_B$.

(10) $U2_{B(Fr)}$ and $U2_{B(Rr)}$ are set so that $U2_{B(Fr)} \times Lx'_{B(Fr)} + U2_{B(Rr)} \times Lx'_{B(Rr)} = -U1_{B(Fr)} \times Ly'_B - U1_{B(Rr)} \times Ly'_B$.

(11) From (10) above, the moment of the centrifugal force caused by $U1_{B(Fr)}$, the moment of the centrifugal force caused by $U1_{B(Rr)}$, the moment of the centrifugal force caused by $U2_{B(Fr)}$ and the moment of the centrifugal force caused by $U2_{B(Rr)}$ are in balance with each other.

(12) From (1) and (4) above, $U1_{B(Fr)}+U1_{B(Rr)}=-U_P \times 0.5$.

(13) Substituting Expressions (7) and (12) above into Expression (10) above yields $U2_{B(Fr)} \times Lx'_{B(Fr)} - U2_{B(Fr)} \times Lx'_{B(Rr)} = U_P \times 0.5 \times Ly'_B$. This can be rearranged into $U2_{B(Fr)} = -U_P \times 0.5 \times \{Ly'_B/(Lx'_{B(Rr)} - Lx'_{B(Fr)})\}$.

(14) Thus, this state is where the primary inertial force of the reciprocal movement portion of the engine, the centrifugal force of the rotary movement portion, the centrifugal force of the first balancer shaft and the centrifugal force of the second balancer shaft are in balance with each other, and where the moments generated due to difference between lines of action of the primary inertial force of the reciprocal movement portion, the centrifugal force of the rotary movement portion, the centrifugal force of the first balancer shaft and the centrifugal force of the second balancer shaft are in balance with each other.

Thus, the state where the direction of the unbalance net force is the direction of the Y' axis and the X' axis is a state where the primary inertial force of the reciprocal movement portion of the engine 10, the centrifugal force generated by the rotary movement portion, the centrifugal force generated by the first balancer shaft and the centrifugal force generated by the second balancer shaft are in balance with each other, and where the moments generated due to difference between lines of action of the primary inertial force of the reciprocal movement portion, the centrifugal force of the rotary movement portion, the centrifugal force of the first balancer shaft and the centrifugal force of the second balancer shaft are in balance with each other. It can be confirmed from the simulation results to be discussed below that also in a state other than this state, the primary inertial force of the reciprocal movement portion, the centrifugal force generated by the rotary movement portion, the centrifugal force generated by the first balancer shaft and the centrifugal force generated by the second balancer shaft are in balance with each other, and the moments generated due to difference between lines of action of the primary inertial force of the reciprocal movement portion, the centrifugal force of the rotary movement portion, the centrifugal force of the first balancer shaft and the centrifugal force of the second balancer shaft are in balance with each other.

For the X-axis direction, Expression (A) below needs to be satisfied in order to achieve balance between the centrifugal force of the rotary movement portion, the centrifugal force of the first balancer shaft and the centrifugal force of the second balancer shaft:

$$Fx_{Cr}+Fx_{B(Fr)}+Fx_{B(Rr)}=0 \qquad (A)$$

where $Fx_{Cr}$: X-direction component of the centrifugal force caused by the rotary movement portion at each rotation angle of the crankshaft $= U_{Cr} \times \sin(-\theta_{Cr}-\alpha_{Cr}) \times \omega^2$ $Fx_{B(Fr)}$: X-direction component of the centrifugal force caused by the first balancer shaft at each rotation angle of the crankshaft $= U_{B(Fr)} \times \sin(\theta_{Cr}-\alpha_{B(Fr)}) \times \omega^2$ $Fx_{B(Rr)}$: X-direction component of the centrifugal force caused by the second balancer shaft at each rotation angle of the crankshaft $= U_{B(Rr)} \times \sin(\theta_{Cr}-\alpha_{B(Rr)}) \times \omega^2$ ω: angular velocity of the crankshaft.

For the Y-axis direction, Expression (B) below needs to be satisfied in order to achieve balance between the primary inertial force of the reciprocal movement portion, the centrifugal force of the rotary movement portion, the centrifugal force of the first balancer shaft and the centrifugal force of the second balancer shaft:

$$F_P+Fy_{Cr}+Fy_{B(Fr)}+Fy_{B(Rr)}=0 \qquad (B)$$

where $F_P$: primary inertial force of the reciprocal movement portion at each rotation angle of the crankshaft $= U_P \times \cos\theta_{Cr} \times \omega^2$ $Fy_{Cr}$: Y-direction component of the centrifugal force caused by the rotary movement portion at each rotation angle of the crankshaft $= U_{Cr} \times \cos(-\theta_{Cr}-\alpha_{Cr}) \times \omega^2$ $Fy_{B(Fr)}$: Y-direction component of the centrifugal force caused by the first balancer shaft at each rotation angle of the crankshaft $= U_{B(Fr)} \times \cos(\theta_{Cr}-\alpha_{B(Fr)}) \times \omega^2$ $Fy_{B(Rr)}$: Y-direction component of the centrifugal force caused by the second balancer shaft at each rotation angle of the crankshaft $= U_{B(Rr)} \times \cos(\theta_{Cr}-\alpha_{B(Rr)}) \times \omega^2$.

Expression (C) below needs to be satisfied in order to achieve balance between the moments generated due to difference between lines of action of the primary inertial force of the reciprocal movement portion, the centrifugal force of the rotary movement portion, the centrifugal force of the first balancer shaft and the centrifugal force of the second balancer shaft:

$$Mx_{B(Fr)}+My_{B(Fr)}+Mx_{B(Rr)}+My_{B(Rr)}=0 \qquad (C)$$

where $Mx_{B(Fr)}$: moment of the X-direction component of the centrifugal force of the first balancer shaft at each rotation angle of the crankshaft $= -Fx_{B(Fr)} \times Ly_{B(Fr)}$ $My_{B(Fr)}$: moment of the Y-direction component of the centrifugal force of the first balancer shaft at each rotation angle of the crankshaft $= Fy_{B(Fr)} \times Lx_{B(Fr)}$ $Mx_{B(Rr)}$: moment of the X-direction component of the centrifugal force of the second balancer shaft at each rotation angle of the crankshaft $= -Fx_{B(Rr)} \times Ly_{B(Rr)}$ $My_{B(Rr)}$: moment of the Y-direction component of the centrifugal force of the second balancer shaft at each rotation angle of the crankshaft $= Fy_{B(Rr)} \times Lx_{B(Rr)}$ In view of this, it was decided in the present embodiment to configure the reciprocal movement portion, the rotary movement portion, the first balancer shaft and the second balancer shaft so as to satisfy setting formulae below. Then, Expressions (A) to (C) are satisfied.

$$U_{Cr}=U_P \times 0.5$$

$$\alpha_{Cr}=180°$$

$$U_{B(Fr)}=\{U1_{B(Fr)}^2+U2_{B(Fr)}^2\}^{1/2}$$

$$U1_{B(Fr)}=-U_P \times 0.5 \times \{Lx'_{B(Rr)}/(Lx'_{B(Rr)}-Lx'_{B(Fr)})\}$$

$$U2_{B(Fr)}=U_P \times 0.5 \times \{Ly'_B/(Lx'_{B(Rr)}-Lx'_{B(Fr)})\}$$

$$\alpha_{B(Fr)}=180°-\arctan(U2_{B(Fr)}/U1_{B(Fr)})$$

$$U_{B(Rr)}=\{U1_{B(Rr)}^2+U2_{B(Rr)}^2\}^{1/2}$$

$$U1_{B(Rr)}=-U_P \times 0.5 \times \{Lx'_{B(Fr)}/(Lx'_{B(Fr)}-Lx'_{B(Rr)})\}$$

$$U2_{B(Fr)}=-U2_{B(Fr)}$$

$$\alpha_{B(Rr)}=180°-\arctan(U2_{B(Rr)}/U1_{B(Rr)})$$

Effects of First Embodiment

According to the present embodiment, even though the axis C0 of the crankshaft Cr, the axis C1 of the first balancer shaft $B_{(Fr)}$ and the axis C2 of the second balancer shaft $B_{(Rr)}$ are not arranged on the same plane (see FIG. 3), the primary inertial force of the reciprocal movement portion, the centrifugal force of the rotary movement portion, the centrifugal force of the first balancer shaft $B_{(Fr)}$ and the centrifugal force of the second balancer shaft $B_{(Rr)}$ are in balance with each other, and the moments generated due to difference between lines of action of the primary inertial force of the reciprocal movement portion, the centrifugal force of the rotary movement portion, the centrifugal force of the first balancer shaft $B_{(Fr)}$ and the centrifugal force of the second balancer shaft $B_{(Rr)}$ are in balance with each other. Thus, it is possible to highly control the translational vibration caused by the primary inertial force and the centrifugal forces of the engine 10, and the rotational vibration caused by the moment.

By the introduction of the X'-Y' coordinates as described above, even though the axis C0 of the crankshaft Cr, the axis C1 of the first balancer shaft $B_{(Fr)}$ and the axis C2 of the second balancer shaft $B_{(Rr)}$ are not arranged on the same plane, it is possible to easily design the first balancer shaft $B_{(Fr)}$ and the second balancer shaft $B_{(Rr)}$ so that the primary inertial force of the reciprocal movement portion, the centrifugal force of the rotary movement portion, the centrifugal force of the first balancer shaft $B_{(Fr)}$ and the centrifugal force of the second balancer shaft $B_{(Rr)}$ are kept in balance with each other and the moments caused due to difference between the lines of action are kept in balance with each other.

According to the present embodiment, vibration is controlled for each cylinder. Therefore, although the engine 10 includes a plurality of cylinders, it is possible to desirably control the overall vibration of the engine 10 by performing the design processes described above for each cylinder. There is no need to particularly take into consideration the relationship between cylinders, and it is therefore possible to easily control the overall vibration of the engine 10.

The engine 10 for a motorcycle is required to have a high level of compactness. In order to make the engine 10 compact, it is necessary in some cases to employ such an arrangement that the axis C0 of the crankshaft Cr, the axis C1 of the first balancer shaft $B_{(Fr)}$ and the axis C2 of the second balancer shaft $B_{(Rr)}$ are not present on the same plane, as in the present embodiment. According to the present embodiment, however, it is possible, even with such an arrangement, to highly control the primary vibration of the engine 10. The design method described above is particularly useful for realizing a compact engine 10.

According to the present embodiment, the crankshaft Cr, the first balancer shaft $B_{(Fr)}$ and the second balancer shaft $B_{(Rr)}$ each extend in the vehicle width direction. As shown in FIG. 3, the first balancer shaft $B_{(Fr)}$ is arranged forward of the crankshaft Cr, and the second balancer shaft $B_{(Rr)}$ is arranged rearward of the crankshaft Cr. With such a configuration, it is possible to obtain the engine 10 that is desirable as a motorcycle engine.

With the engine 10 of the present embodiment, the axis 30c of the drive shaft 30 is arranged rearward of the axis C0 of the crankshaft Cr as shown in FIG. 3. The axis 29c of the main shaft 29 is arranged rearward of and above the axis C0 of the crankshaft Cr and forward of and above the axis 30c of the drive shaft 30. The axis C1 of the first balancer shaft $B_{(Fr)}$ is arranged forward of and below the axis C0 of the crankshaft Cr. The axis C2 of the second balancer shaft $B_{(Rr)}$ is arranged rearward of and above the axis C0 of the crankshaft Cr and forward of the axis of the main shaft 29. With such an arrangement, it is possible to make the engine 10 compact.

The axis C1 of the first balancer shaft $B_{(Fr)}$ is not present in the plane P2, which contains the axis C0 of the crankshaft Cr and the axis C2 of the second balancer shaft $B_{(Rr)}$, but is located diagonally forward and upward of a portion of the plane P2 that lies below the axis C0 of the crankshaft Cr. Therefore, the first balancer shaft $B_{(Fr)}$ can be arranged more upward as compared with a case where the axis C1 of the first balancer shaft $B_{(Fr)}$ is present in the plane P2. Thus, it is possible to reduce the size of the engine 10 in the vehicle up-down direction.

Second Embodiment

With the engine 10 of the first embodiment, the center lines 21L and 22L of the cylinders 21 and 22 are located on the axis C0 of the crankshaft Cr as seen from the axial direction of the crankshaft Cr (see FIG. 3). In contrast, with the engine 10 of the second embodiment, the center lines 21L and 22L of the cylinders 21 and 22 are off the axis C0 of the crankshaft Cr as seen from the axial direction of the crankshaft Cr. That is, the center lines 21L and 22L of the cylinders 21 and 22 are offset from the axis C0 of the crankshaft Cr.

Also in the present embodiment, the reciprocal movement portion, the rotary movement portion, the first balancer shaft $B_{(Fr)}$ and the second balancer shaft $B_{(Rr)}$ are in balance with each other for each cylinder. In the following description, only the first cylinder 21 will be described, and the second cylinder 22 will not be described.

Also in the present embodiment, in order to highly control the translational vibration and the rotational vibration of the engine 10, there is a need to ensure balance between the primary inertial force of the reciprocal movement portion, the centrifugal force of the rotary movement portion, the centrifugal force of the first balancer shaft $B_{(Fr)}$ and the centrifugal force of the second balancer shaft $B_{(Rr)}$ at any rotation angle of the crankshaft Cr, and to ensure balance between moments that are generated due to difference between lines of action of the primary inertial force of the reciprocal movement portion, the centrifugal force of the rotary movement portion, the centrifugal force of the first balancer shaft $B_{(Fr)}$ and the centrifugal force of the second balancer shaft $B_{(Rr)}$.

Figure 8:
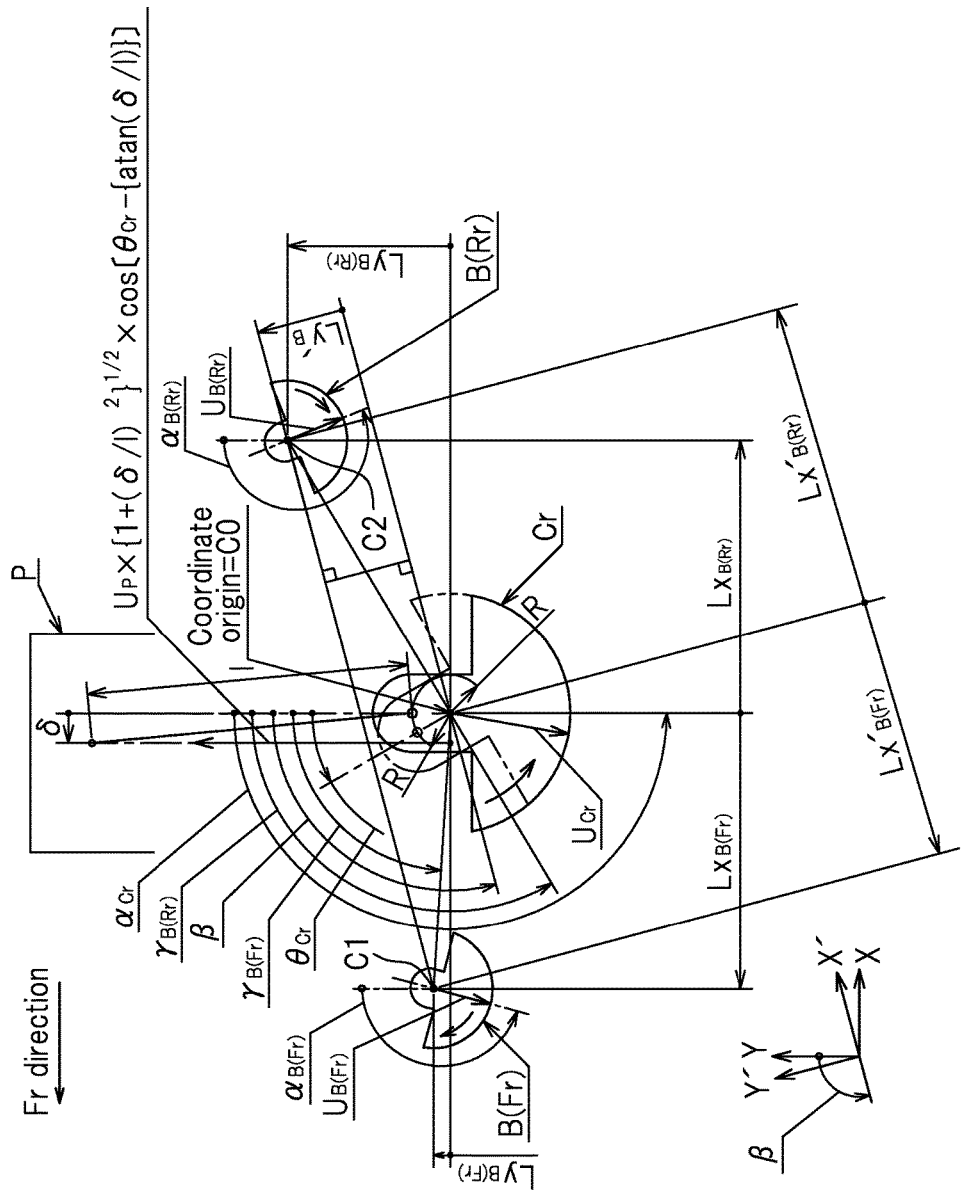
FIG. 8 is a view illustrating denotations used in the second embodiment.
Figure 11:
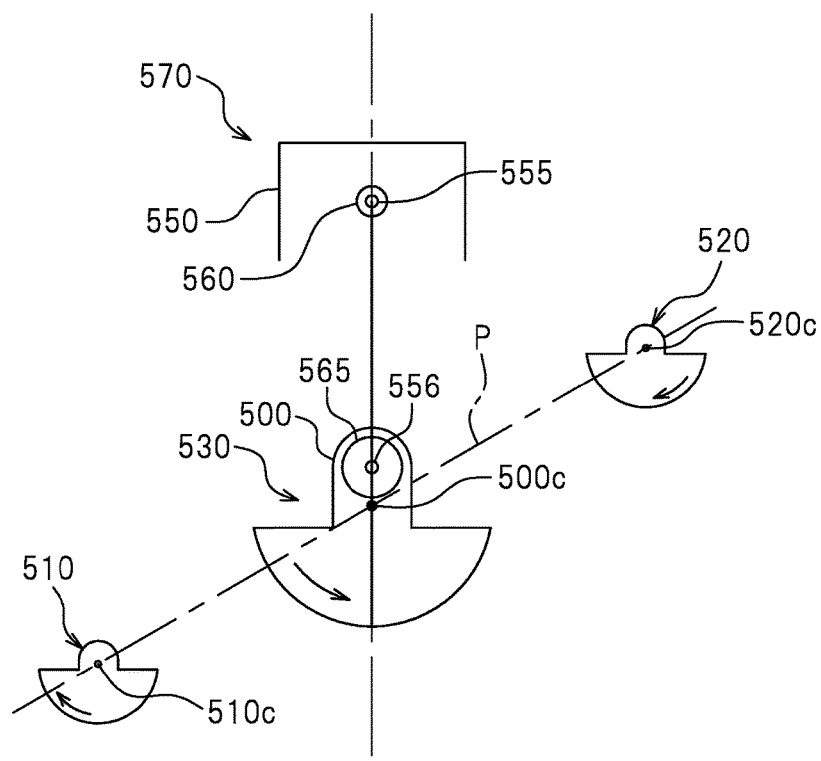
FIG. 11 is a view schematically showing a conventional engine.

The following denotations will be used in the description below (see FIG. 8). Assume that the axis C0 of the crankshaft is the origin, the axis extending from the origin toward the piston 23 in parallel to the center line 21L of the cylinder 21 is the Y axis and the axis perpendicular to the Y axis is the X axis as seen from the axial direction of the crankshaft Cr. Assume that the rotation direction of the crankshaft Cr is the forward rotation direction and the opposite direction to the rotation direction of the crankshaft Cr is the reverse rotation direction as seen from the axial direction of the crankshaft Cr.

P: reciprocal movement portion
Cr: crankshaft
$B_{(Fr)}$: first balancer shaft
$B_{(Rr)}$: second balancer shaft
$Lx_{B(Fr)}$: X coordinate value of the axis of the first balancer shaft
$Ly_{B(Fr)}$: Y coordinate value of the axis of the first balancer shaft
$Lx_{B(Rr)}$: X coordinate value of the axis of the second balancer shaft
$Ly_{B(Rr)}$: Y coordinate value of the axis of the second balancer shaft l distance between the center of the piston pin and the center of the crank pin portion δ: amount of offset of the cylinder (in other words, the distance from the axis of the crankshaft to the center line of the cylinder)

β: angle, in the forward rotation direction, of the straight line connecting between the axis of the first balancer shaft and the axis of the second balancer shaft, from the Y axis, as seen from the axial direction of the crankshaft=90°+arctan $\{(Ly_{B(Rr)}-Ly_{B(Fr)})/(Lx_{B(Rr)}-Lx_{B(Fr)})\}$ $\gamma_{B(Fr)}$: angle, in the forward rotation direction, of the straight line connecting between the axis of the first balancer shaft and the axis of the crankshaft, from the Y axis, as seen from the axial direction of the crankshaft=90°+arctan $(Ly_{B(Fr)}/Lx_{B(Fr)})$ $\gamma_{B(Rr)}$: angle, in the forward rotation direction, of the straight line connecting between the axis of the second balancer shaft and the axis of the crankshaft, from the Y axis, as seen from the axial direction of the crankshaft=90°+arctan$(Ly_{B(Rr)}/Lx_{B(Rr)})$ X' axis: axis inclined from the X axis by β-90° in the forward rotation direction Y' axis: axis inclined from the Y axis by β-90° in the forward rotation direction $Lx'_{B(Fr)}$: X' coordinate value of the axis of the first balancer shaft=$(Lx_{B(Fr)}-Ly_{B(Fr)}/\tan\beta)\times\sin\beta$ $Ly'_B$: Y' coordinate value of the axis of the first balancer shaft and the second balancer shaft=$(Lx_{B(Fr)}+Ly_{B(Fr)}\times\tan\beta)\times\cos\beta$ $Lx'_{B(Rr)}$: X' coordinate value of the axis of the second balancer shaft=$(Lx_{B(Rr)}-Ly_{B(Rr)}/\tan\beta)\times\sin\beta$ $\theta_{Cr}$: rotation angle of the crankshaft in the forward rotation direction (where $\theta_{Cr}$ is assumed to be 0° when the crank pin portion of the crankshaft is on the Y axis)

$U_P$: unbalance amount of the reciprocal movement portion=$m_P \times R$ (where $m_P$ is the mass of the reciprocal movement portion, and R is the crank radius)

$U_{Cr}$: unbalance amount of the rotary movement portion=$m_{Cr} \times r_{Cr}$ (where $m_{Cr}$ is the mass of the rotary movement portion, and $r_{Cr}$ is the distance between the axis of the crankshaft and the center of gravity of the rotary movement portion)

$\alpha_{Cr}$: unbalance direction (the angle in the forward rotation direction from the Y axis) of the rotary movement portion when $\theta_{Cr}$=arctan (δ/l) °

$U_{B(Fr)}$: unbalance amount of the first balancer shaft=$m_{B(Fr)} \times r_{B(Fr)}$ (where $M_{B(Fr)}$ is the mass of the first balancer shaft, and $r_{B(Fr)}$ is the distance between the axis of the first balancer shaft and the center of gravity of the first balancer shaft)

$U1_{B(Br)}$: Y-axis direction component 1 of the unbalance amount of the first balancer shaft (=$U_{B(Fr)}$) when $\theta_{Cr}$=arctan(δ/l)°

$U2_{B(Fr)}$: X-axis direction component 1 of the unbalance amount of the first balancer shaft (=$U_{B(Fr)}$) when $\theta_{Cr}$=arctan(δ/l)°

$U3_{B(Fr)}$: Y-axis direction component 2 of the unbalance amount of the first balancer shaft (=$U_{B(Fr)}$) when $\theta_{Cr}$=arctan(δ/l)°

$U4_{B(Fr)}$: X-axis direction component 2 of the unbalance amount of the first balancer shaft (=$U_{B(Fr)}$) when $\theta_{Cr}$=arctan(δ/l)°

$\alpha_{B(Fr)}$: unbalance direction (the angle in the forward rotation direction from the Y axis) of the first balancer shaft when $\theta_{Cr}$=arctan(δ/l)°

$U_{B(Rr)}$: unbalance amount of the second balancer shaft=$m_{B(Rr)} \times r_{B(Rr)}$ (where $m_{B(Rr)}$ is the mass of the second balancer shaft, and $r_{B(Rr)}$ is the distance between the axis of the second balancer shaft and the center of gravity of the second balancer shaft)

$U1_{B(Rr)}$: Y-axis direction component 1 of the unbalance amount of the second balancer shaft (=$U_{B(Rr)}$) when $\theta_{Cr}$=arctan(δ/l)°

$U2_{B(Rr)}$: X-axis direction component 1 of the unbalance amount of the second balancer shaft (=$U_{B(Rr)}$) when $\theta_{Cr}$=arctan(δ/l)°

$U3_{B(Rr)}$: Y-axis direction component 2 of the unbalance amount of the second balancer shaft (=$U_{B(Rr)}$) when $\theta_{Cr}$=arctan(δ/l)°

$U4_{B(Rr)}$: X-axis direction component 2 of the unbalance amount of the second balancer shaft (=$U_{B(Rr)}$) when $\theta_{Cr}$=arctan(δ/l)°

$\alpha_{B(Rr)}$: unbalance direction (the angle in the forward rotation direction from the Y axis) of the second balancer shaft when $\theta_{Cr}$=arctan(δ/l)°

For the X-axis direction, Expression (A) below needs to be satisfied in order to achieve balance between the centrifugal force of the rotary movement portion, the centrifugal force of the first balancer shaft and the centrifugal force of the second balancer shaft:

$$Fx_{Cr}+Fx_{B(Fr)}+Fx_{B(Rr)}=0 \tag{A}$$

where $Fx_{Cr}$: X-direction component of the centrifugal force caused by the rotary movement portion at each rotation angle of the crankshaft=$U_{Cr} \times \sin(-\theta_{Cr}-\alpha_{Cr}) \times \omega^2$ $Fx_{B(Fr)}$: X-direction component of the centrifugal force caused by the first balancer shaft at each rotation angle of the crankshaft=$U_{B(Fr)} \times \sin(\theta_{Cr}-\alpha_{B(Fr)}) \times \omega^2$ $Fx_{B(Rr)}$: X-direction component of the centrifugal force caused by the second balancer shaft at each rotation angle of the crankshaft=$U_{B(Rr)} \times \sin(\theta_{Cr}-\alpha_{B(Rr)}) \times \omega^2$ ω: angular velocity of the crankshaft.

For the Y-axis direction, Expression (B) below needs to be satisfied in order to achieve balance between the primary inertial force of the reciprocal movement portion, the centrifugal force of the rotary movement portion, the centrifugal force of the first balancer shaft and the centrifugal force of the second balancer shaft:

$$F_P+Fy_{Cr}+Fy_{B(Fr)}+Fy_{B(Rr)}=0 \tag{B}$$

where $F_P$: primary inertial force of the reciprocal movement portion at each rotation angle of the crankshaft=$U_P \times \{1+(\delta/l)^2\}^{1/2} \times \cos[\theta_{Cr}-\{\arctan(\delta/l)\}] \times \omega^2$ $Fy_{Cr}$: Y-direction component of the centrifugal force caused by the rotary movement portion at each rotation angle of the crankshaft=$U_{Cr} \times \cos(-\theta_{Cr}-\alpha_{Cr}) \times \omega^2$ $Fy_{B(Fr)}$: Y-direction component of the centrifugal force caused by the first balancer shaft at each rotation angle of the crankshaft=$U_{B(Fr)} \times \cos(\theta_{Cr}-\alpha_{B(Fr)}) \times \omega^2$ $Fy_{B(Rr)}$: Y-direction component of the centrifugal force caused by the second balancer shaft at each rotation angle of the crankshaft=$U_{B(Rr)} \times \cos(\theta_{Cr}-\alpha_{B(Rr)}) \times \omega^2$.

Expression (C) below needs to be satisfied in order to achieve balance between the moments generated due to difference between lines of action of the primary inertial force of the reciprocal movement portion, the centrifugal force of the rotary movement portion, the centrifugal force of the first balancer shaft and the centrifugal force of the second balancer shaft:

$$M_P+Mx_{B(Fr)}+My_{B(Fr)}+Mx_{B(Rr)}+My_{B(Rr)}=0 \tag{C}$$

where $M_P$: moment caused by the reciprocal movement portion at each rotation angle of the crankshaft=$-F_P \times \delta$ $Mx_{B(Fr)}$: moment of the X-direction component of the centrifugal force of the first balancer shaft at each rotation angle of the crankshaft=$-Fx_{B(Fr)} \times Ly_{B(Fr)}$ $My_{B(Fr)}$: moment of the Y-direction component of the centrifugal force of the first balancer shaft at each rotation angle of the crankshaft=$Fy_{B(Fr)} \times Lx_{B(Fr)}$ $Mx_{B(Rr)}$: moment of the X-direction component of the centrifugal force of the second balancer shaft at each rotation angle of the crankshaft=$-Fx_{B(Fr)} \times Ly_{B(Fr)}$ $My_{B(Fr)}$: moment of the Y-direction component of the centrifugal force of the second balancer shaft at each rotation angle of the crankshaft=$Fy_{B(Fr)} \times Lx_{B(Fr)}$.

In view of this, it was decided in the present embodiment to configure the reciprocal movement portion, the rotary movement portion, the first balancer shaft and the second balancer shaft so as to satisfy setting formulae below. Then, Expressions (A) to (C) are satisfied.

$$U_{Cr} = U_P \times 0.5 \times \{1+(\delta/l)^2\}^{1/2}$$

$$\alpha_{Cr} = 180° - \arctan(\delta/l)$$

$$U_{B(Fr)} = \{(U1_{B(Fr)} + U3_{B(Fr)})^2 + (U2_{B(Fr)} + U4_{B(Fr)})^2\}^{1/2}$$

$$U1_{B(Fr)} = -U_P \times 0.5 \times \{Lx'_{B(Rr)}/(Lx'_{B(Rr)} - Lx'_{B(Fr)})\} \times \{1+(\delta/l)^2\}^{1/2}$$

$$U2_{B(Fr)} = -U_P \times 0.5 \times \{Ly'_B/(Lx'_{B(Rr)} - Lx'_{B(Fr)})\} \times \{1+(\delta/l)^2\}^{1/2}$$

$$U3_{B(Fr)} = -U_P \times \{\delta/(Lx'_{B(Rr)} - Lx'_{B(Fr)})\} \times \sin\beta \times \{1+(\delta/l)^2\}^{1/2}$$

$$U4_{B(Fr)} = -U_P \times \{\delta/(Lx'_{B(Rr)} - Lx_{B(Fr)})\} \times \cos\beta \times \{1+(\delta/l)^2\}^{1/2}$$

$$\alpha_{B(Fr)} = 180° - \arctan\{(U2_{B(Fr)} + U4_{B(Fr)})/(U1_{B(Fr)} + U3_{B(Fr)})\} + \arctan(\delta/l)$$

$$U_{B(Rr)} = \{(U1_{B(Rr)} + U3_{B(Rr)})^2 + (U2_{B(Rr)} + U4_{B(Rr)})^2\}^{1/2}$$

$$U1_{B(Rr)} = -U_P \times 0.5 \times \{Lx'_{B(Fr)}/(Lx'_{B(Fr)} - Lx'_{B(Rr)})\} \times \{1+(\delta/l)^2\}^{1/2}$$

$$U2_{B(Rr)} = -U2_{B(Fr)}$$

$$U3_{B(Rr)} = -U3_{B(Fr)}$$

$$U4_{B(Rr)} = -U4_{B(Fr)}$$

$$\alpha_{B(Rr)} = 180° - \arctan\{(U2_{B(Rr)} + U4_{B(Rr)})/(U1_{B(Rr)} + U3_{B(Rr)})\} + \arctan(\delta/l)$$

Effects of Second Embodiment

According to the present embodiment, even though the axis C0 of the crankshaft Cr, the axis C1 of the first balancer shaft $B_{(Fr)}$ and the axis C2 of the second balancer shaft $B_{(Rr)}$ are not arranged on the same plane and even though the axis C0 of the crankshaft Cr is offset from the center lines 21L and 22L of the cylinders 21 and 22, the primary inertial force of the reciprocal movement portion, the centrifugal force of the rotary movement portion, the centrifugal force of the first balancer shaft $B_{(Fr)}$ and the centrifugal force of the second balancer shaft are in balance with each other, and the moments generated due to difference between lines of action of the primary inertial force of the reciprocal movement portion, the centrifugal force of the rotary movement portion, the centrifugal force of the first balancer shaft $B_{(Fr)}$ and the centrifugal force of the second balancer shaft are in balance with each other. Thus, it is possible to highly control the translational vibration caused by the primary inertial force and the centrifugal forces of the engine 10, and the rotational vibration caused by the moment.

Example 1

A simulation was conducted on an engine of Embodiment 1 having the following configuration. The results are shown in Table 1 (see FIG. 9). Note that the rotation speed of the crankshaft was set to 6000 rpm in this simulation. In Table 1, the term "translational force" refers to the total of the primary inertial force and the centrifugal forces for each of the X-axis direction and the Y-axis direction. The term "rotational force" refers to the total of the moments generated due to difference between lines of action of the primary inertial force and the centrifugal forces.

$Lx_{B(Fr)} = -55.787$ mm $Ly_{B(Fr)} = 4.881$ mm $Lx_{B(Rr)} = 55.426$ mm $Ly_{B(Rr)} = 32$ mm $U_P = 15000$ g·mm (where $m_P = 500$ g, $R = 30$ mm)

$U_{Cr} = 7500$ g·mm $\alpha_{Cr} = 180$ deg $U_{B(Fr)} = 4193$ g·mm $(U1_{B(Fr)} = -4025$ g·mm)

$(U2_{B(Fr)} = -1177$ g·mm)

$\alpha_{B(Fr)} = 163.7$ deg $U_{B(Rr)} = 3669$ g·mm $(U1_{B(Rr)} = -3475$ g·mm)

$(U2_{B(Rr)} = 1177$ g·mm)

$\alpha_{B(Rr)} = 198.7$ deg

It can be seen from Table 1 that the translational force for the X direction, the translational force for the Y direction and the rotational force are always zero even if the rotation angle of the crankshaft (crankshaft angle) changes. Thus, it can be seen that the primary vibration of the engine 10 is highly controlled. Note that since the primary inertial force and the centrifugal force are both in proportion to the rotation speed of the crankshaft squared, the balance therebetween will not be lost even if the rotation speed changes.

Example 2

A simulation was conducted on an engine of Embodiment 2 having the following configuration. The results are shown in Table 2 (see FIG. 10). Note that the rotation speed of the crankshaft was set to 6000 rpm in this simulation. In Table 2, the term "translational force" refers to the total of the primary inertial force and the centrifugal forces for each of the X-axis direction and the Y-axis direction. The term "rotational force" refers to the total of the moments generated due to difference between lines of action of the primary inertial force and the centrifugal forces.

$Lx_{B(Fr)} = -55.787$ mm $Ly_{B(Fr)} = 4.881$ mm $Lx_{B(Rr)} = 55.426$ mm $Ly_{B(Rr)} = 32.000$ mm $l = 120$ mm $\delta = 8$ mm $U_P = 15000$ g·mm (where $m_P = 500$ g, $R = 30$ mm)

$U_{Cr} = 7517$ g·mm $\alpha_{Cr} = 176.2$ deg $U_{B(Fr)} = 5139$ g·mm $(U1_{B(Fr)} = -4034$ g·mm$)$ $(U2_{B(Fr)} = -1179$ g·mm$)$ $(U3_{B(Fr)} = -1021$ g·mm$)$ $(U4_{B(Fr)} = 249$ g·mm$)$ $\alpha_{B(Fr)} = 173.4$ deg $U_{B(Rr)} = 2632$ g·mm $(U1_{B(Rr)} = -3483$ g·mm$)$ $(U2_{B(Rr)} = 1179$ g·mm$)$ $(U3_{B(Rr)} = 1021$ g·mm$)$ $(U4_{B(Rr)} = -249$ g·mm$)$ $\alpha_{B(Rr)} = 204.5$ deg It can be seen from Table 2 that the translational force for the X direction, the translational force for the Y direction and the rotational force are always zero even if the crankshaft angle changes. Thus, it can be seen that the primary vibration of the engine 10 is highly controlled. Note that since the primary inertial force and the centrifugal force are both in proportion to the rotation speed of the crankshaft squared, the balance therebetween will not be lost even if the rotation speed changes.

Note that it is understood that the embodiments and the examples described above are merely illustrative and that the reciprocating machine of the present invention can be achieved also by other embodiments. For example, although the crankshaft Cr, the first balancer shaft $B_{(Fr)}$ and the second balancer shaft $B_{(Rr)}$ extend in the vehicle left-right direction in the embodiments described above, the crankshaft Cr, the first balancer shaft $B_{(Fr)}$ and the second balancer shaft $B_{(Rr)}$ may extend in the vehicle front-rear direction.

REFERENCE SIGNS LIST

1 Motorcycle
21 First cylinder
22 Second cylinder
23 Piston
24 Conrod
Cr Crankshaft
$B_{(Fr)}$ First balancer shaft
$B_{(Rr)}$ Second balancer shaft
C0 Axis of crankshaft
C1 Axis of first balancer shaft
C2 Axis of second balancer shaft

The invention claimed is:

1. A machine having a reciprocating slider crank mechanism, the machine comprising:
a cylinder;
a reciprocal movement portion including
a piston configured to reciprocate in the cylinder,
a piston pin, and
a small end portion of a conrod, the small end portion being connected to the piston by the piston pin;
a rotary movement portion including
a rotatable crankshaft having a crank pin portion, and
a big end portion of the conrod, the big end portion being connected to the crank pin portion of the crankshaft;
a first balancer shaft configured to rotate, together with the rotation of the crankshaft, in an opposite rotation direction to that of the crankshaft at a same rotation speed as that of the crankshaft; and
a second balancer shaft arranged on an opposite side from the first balancer shaft with respect to a center line of the cylinder as seen from an axial direction of the crankshaft, the second balancer shaft configured to rotate, together with the rotation of the crankshaft, in an opposite rotation direction to that of the crankshaft at the same rotation speed as that of the crankshaft;
wherein:
an axis of the crankshaft, an axis of the first balancer shaft and an axis of the second balancer shaft are not arranged on a same plane; and
the reciprocating slider crank mechanism is configured so as to satisfy a setting formulae below:

$U_{Cr} = U_P \times 0.5$, $\alpha_{Cr} = 180°$, $U_{B(Fr)} = \{U1_{B(Fr)}^2 + U2_{B(Fr)}^2\}^{1/2}$, $U1_{B(Fr)} = -U_P \times 0.5 \times \{Lx'_{B(Rr)}/(Lx'_{B(Rr)} - Lx'_{B(Fr)})\}$, $U2_{B(Fr)} = -U_P \times 0.5 \times \{Ly'_B/(Lx'_{B(Rr)} - Lx'_{B(Fr)})\}$, $\alpha_{B(Fr)} = 180° - \arctan(U2_{B(Fr)}/U1_{B(Fr)})$, $U_{B(Rr)} = \{U1_{B(Rr)}^2 + U2_{B(Rr)}^2\}^{1/2}$, $U1_{B(Rr)} = -U_P \times 0.5 \times \{Lx'_{B(Fr)}/(Lx'_{B(Fr)} - Lx'_{B(Rr)})\}$, $U2_{B(Rr)} = -U2_{B(Fr)}$, and $\alpha_{B(Rr)} = 180° - \arctan(U2_{B(Rr)}/U1_{B(Rr)})$, where
as seen from the axial direction of the crankshaft, the axis of the crankshaft is an origin, an axis extending from the origin toward the piston along the center line of the cylinder is a Y axis and an axis perpendicular to the Y axis is an X axis,
as seen from the axial direction of the crankshaft, the rotation direction of the crankshaft is a forward rotation direction and an opposite direction to the rotation direction of the crankshaft is a reverse rotation direction,
$Lx_{B(Fr)}$: a X coordinate value of the axis of the first balancer shaft as measured on the X axis, $Ly_{B(Fr)}$: a Y coordinate value of the axis of the first balancer shaft as measured on the Y axis, $Lx_{B(Rr)}$: a X coordinate value of the axis of the second balancer shaft as measured on the X axis, $Ly_{B(Rr)}$: a Y coordinate value of the axis of the second balancer shaft as measured on the Y axis, β: as seen from the axial direction of the crankshaft, a first angle, in the forward rotation direction, being measured between a straight line, connecting between the axis of the first balancer shaft and the axis of the second balancer shaft, and the Y axis, the first angle being $90°+\arctan\{(Ly_{B(Rr)}-Ly_{B(Fr)})/(Lx_{B(Rr)}-Lx_{B(Fr)})\}$, $\gamma_{B(Fr)}$: as seen from the axial direction of the crankshaft, a second angle, in the forward rotation direction, between a straight line, connecting between the axis of the first balancer shaft and the axis of the crankshaft, and the Y axis, the second angle being $90°+\arctan(Ly_{B(Fr)}/Lx_{B(Fr)})$, $\gamma_{B(Rr)}$: as seen from the axial direction of the crankshaft, a third angle, in the forward rotation direction, between a straight line, connecting between the axis of the second balancer shaft and the axis of the crankshaft, and the Y axis, the third angle being $90°+\arctan(Ly_{B(Rr)}/Lx_{B(Rr)})$, X' axis: an axis inclined from the X axis by β-90° in the forward rotation direction, Y' axis: an axis inclined from the Y axis by β-90° in the forward rotation direction, $Lx'_{B(Fr)}$: a X' coordinate value of the axis of the first balancer shaft as measured on the X' axis=$(Lx_{B(Fr)}-Ly_{B(Fr)})/\tan\beta)\times\sin\beta$, $Ly'_{B}$: a Y' coordinate value of the axis of the first balancer shaft and the second balancer shaft as measured on the Y' axis=$(Lx_{B(Fr)}+Ly_{B(Fr)}\times\tan\beta)\times\cos\beta$, $Lx'_{B(Rr)}$: a X' coordinate value of the axis of the second balancer shaft as measured on the X' axis=$(Lx_{B(Rr)}-Ly_{B(Rr)}/\tan\beta)\times\sin\beta$, $\theta_{Cr}$: an angle of rotation of the crankshaft in the forward rotation direction (where $\theta_{Cr}$ is assumed to be 0° when the crank pin portion of the crankshaft is on the Y axis), $U_P$: an unbalance amount of the reciprocal movement portion=$m_P\times R$ (where $m_P$ is the mass of the reciprocal movement portion, and R is a crank radius), $U_{Cr}$: an unbalance amount of the rotary movement portion=$m_{Cr}\times r_{Cr}$ (where $m_{Cr}$ is the mass of the rotary movement portion, and $r_{Cr}$ is a distance between the axis of the crankshaft and the center of gravity of the rotary movement portion), $\alpha_{Cr}$: an angle in an unbalance direction, which is in the forward rotation direction from the Y axis, of the rotary movement portion when $\theta_{Cr}=0°$, $U_{B(Fr)}$: an unbalance amount of the first balancer shaft=$m_{B(Fr)}\times r_{B(Fr)}$ (where $M_{B(Fr)}$ is the mass of the first balancer shaft, and $r_{B(Fr)}$ is a distance between the axis of the first balancer shaft and the center of gravity of the first balancer shaft), $U1_{B(Fr)}$: a Y-axis direction component of the unbalance amount of the first balancer shaft $U_{B(Fr)}$ when $\theta_{Cr}=0°$, $U2_{B(Fr)}$: a X-axis direction component of the unbalance amount of the first balancer shaft=$U_{B(Fr)}$ when $\theta_{Cr}=0°$, $\alpha_{B(Fr)}$: an unbalance direction (the angle in the forward rotation direction from the Y axis) of the first balancer shaft when $\theta_{Cr}=0°$, $U_{B(Rr)}$: an unbalance amount of the second balancer shaft=$m_{B(Rr)}\times r_{B(Rr)}$ (where $m_{B(Rr)}$ is the mass of the second balancer shaft, and $r_{B(Rr)}$ is a distance between the axis of the second balancer shaft and the center of gravity of the second balancer shaft), $U1_{B(Rr)}$: a Y-axis direction component of the unbalance amount of the second balancer shaft $U_{B(Rr)}$ when $\theta_{Cr}=0°$, $U2_{B(Rr)}$: a X-axis direction component of the unbalance amount of the second balancer shaft $U_{B(Rr)}$ when $\theta_{Cr}=0°$, and $\alpha_{B(Rr)}$: an angle in an unbalance direction, which is in the forward rotation direction from the Y axis, of the second balancer shaft when $\theta_{Cr}=0°$.

2. A machine having a reciprocating slider crank mechanism, the machine comprising:

a cylinder;

a reciprocal movement portion including
a piston configured to reciprocate in a cylinder,
a piston pin, and
a small end portion of a conrod, the small end portion being connected to the piston by the piston pin;

a rotary movement portion including
a rotatable crankshaft having a crank pin portion, and
a big end portion of the conrod, the big end portion being connected to the crank pin portion of the crankshaft;

a first balancer shaft configured to rotate, together with the rotation of the crankshaft, in an opposite rotation direction to that of the crankshaft at a same rotation speed as that of the crankshaft; and a second balancer shaft arranged on an opposite side from the first balancer shaft with respect to a center line of the cylinder as seen from the axial direction of the crankshaft, the second balancer shaft configured to rotate, together with the rotation of the crankshaft, in an opposite rotation direction to that of the crankshaft at the same rotation speed as that of the crankshaft, wherein:

an axis of the crankshaft, an axis of the first balancer shaft and an axis of the second balancer shaft are not arranged on a same plane;

as seen from the axial direction of the crankshaft, a center line of the cylinder is offset from the axis of the crankshaft; and the reciprocating slider crank mechanism is configured so as to satisfy a setting formulae below:

$U_{Cr}=U_P\times 0.5\times\{1+(\delta/l)^2\}^{1/2}$, $\alpha_{Cr}=180°-\arctan(\delta/l)$, $U_{B(Fr)}=\{(U1_{B(Fr)}+U3_{B(Fr)})^2+(U2_{B(Fr)}+U4_{B(Fr)})^2\}^{1/2}$, $U1_{B(Fr)}=-U_P\times 0.5\times\{Lx'_{B(Rr)}/(Lx'_{B(Rr)}-Lx'_{B(Fr)})\}\times\{1+(\delta/l)^2\}^{1/2}$, $U2_{B(Fr)}=-U_P\times 0.5\times\{Ly'_B/(Lx'_{B(Rr)}-Lx'_{B(Fr)})\}\times\{1+(\delta/l)^2\}^{1/2}$, $U3_{B(Fr)}=-U_P\times\{\delta/(Lx'_{B(Rr)}-Lx'_{B(Fr)})\}\times\sin\beta\times\{1+(\delta/l)^2\}^{1/2}$, $U3_{B(Fr)}=-U_P\times\{\delta/(Lx'_{B(Rr)}-Lx'_{B(Fr)})\}\times\cos\beta\times\{1+(\delta/l)^2\}^{1/2}$, $\alpha_{B(Fr)}=180°-\arctan\{(U2_{B(Fr)}+U4_{B(Fr)}/(U1_{B(Fr)}+U3_{B(Fr)})\}+\arctan(\delta/l)$, $U_{B(Rr)}=\{(U1_{B(Rr)}+U3_{B(Rr)})^2+(U2_{B(Rr)}+U4_{B(Rr)})^2\}^{1/2}$, $U1_{B(Rr)}=U_P\times 0.5\times\{Lx'_{B(Fr)}/(Lx'_{B(Fr)}-Lx'_{B(Rr)}\}\times\{1+(\delta/l)^2\}^{1/2}$, $U2_{B(Rr)} = -U2_{B(Fr)}$, $U3_{B(Rr)} = -U3_{B(Fr)}$, $U4_{B(Rr)} = -U4_{B(Fr)}$, and $\alpha_{B(Rr)} = 180° - \arctan\{(U2_{B(Rr)} + U4_{B(Rr)})/(U1_{B(Rr)} + U3_{B(Rr)})\} + \arctan(\delta/l)$, where as seen from the axial direction of the crankshaft, the axis of the crankshaft is an origin, an axis extending from the origin toward the piston in parallel to the center line of the cylinder is a Y axis and an axis perpendicular to the Y axis is an X axis, as seen from the axial direction of the crankshaft, the rotation direction of the crankshaft is a forward rotation direction and an opposite direction to the rotation direction of the crankshaft is a reverse rotation direction, $Lx_{B(Fr)}$: a X coordinate value of the axis of the first balancer shaft as measured on the X axis $Ly_{B(Fr)}$: a Y coordinate value of the axis of the first balancer shaft as measured on the Y axis $Lx_{B(Rr)}$: a X coordinate value of the axis of the second balancer shaft as measured on the X axis, $Ly_{B(Rr)}$: a Y coordinate value of the axis of the second balancer shaft as measured on the Y axis l: a distance between a center of the piston pin and a center of the crank pin portion, $\delta$: an amount of offset of the cylinder, $\beta$: as seen from the axial direction of the crankshaft, a first angle, in the forward rotation direction, being measured between a straight line, connecting between the axis of the first balancer shaft and the axis of the second balancer shaft, and the Y axis, the first angle being $90° + \arctan\{(Ly_{B(Rr)} - Ly_{B(Fr)})/(Lx_{B(Rr)} - Lx_{B(Fr)})\}$, $\gamma_{B(Fr)}$: as seen from the axial direction of the crankshaft, a second angle, in the forward rotation direction, between a straight line, connecting between the axis of the first balancer shaft and the axis of the crankshaft, and the Y axis, the second angle being $90° + \arctan(Ly_{B(Fr)}/Lx_{B(Fr)})$, $\gamma_{B(Rr)}$: as seen from the axial direction of the crankshaft, a third angle, in the forward rotation direction, between a straight line, connecting between the axis of the second balancer shaft and the axis of the crankshaft, and the Y axis, the third angle being $90° + \arctan(Ly_{B(Rr)}/Lx_{B(Rr)})$, X' axis: an axis inclined from the X axis by $\beta - 90°$ in the forward rotation direction, Y' axis: an axis inclined from the Y axis by $\beta - 90°$ in the forward rotation direction, $Lx'_{B(Fr)}$: a X' coordinate value of the axis of the first balancer shaft as measured on the X' axis $= (Lx_{B(Fr)} - Ly_{B(Fr)}/\tan\beta) \times \sin\beta$, $Ly'_B$: a Y' coordinate value of the axis of the first balancer shaft and the second balancer shaft as measured along the Y' axis $= (Lx_{B(Fr)} + Ly_{B(Fr)} \times \tan\beta) \times \cos\beta$, $Lx'_{B(Rr)}$: a X' coordinate value of the axis of the second balancer shaft as measured on the X' axis $= (Lx_{B(Rr)} - Ly_{B(Rr)}/\tan\beta) \times \sin\beta$, $\theta_{Cr}$: an angle of rotation of the crankshaft in the forward rotation direction (where $\theta_{Cr}$ is assumed to be 0° when the crank pin portion of the crankshaft is on the Y axis), $U_P$: an unbalance amount of the reciprocal movement portion $= m_P \times R$ (where $m_P$ is the mass of the reciprocal movement portion, and R is a crank radius), $U_{Cr}$: an unbalance amount of the rotary movement portion $= m_{Cr} \times r_{Cr}$ (where $m_{Cr}$ is the mass of the rotary movement portion, and $r_{Cr}$ is a distance between the axis of the crankshaft and the center of gravity of the rotary movement portion), $\alpha_{Cr}$: an angle in an unbalance direction, which is in the forward rotation direction from the Y axis, of the rotary movement portion when $\theta_{Cr} = \arctan(\delta/1°)$, $U_{B(Fr)}$: an unbalance amount of the first balancer shaft $= m_{B(Fr)} \times r_{B(Fr)}$ (where $M_{B(Fr)}$ is the mass of the first balancer shaft, and $r_{B(Fr)}$ is a distance between the axis of the first balancer shaft and the center of gravity of the first balancer shaft), $U1_{B(Fr)}$: a Y-axis direction component 1 of the unbalance amount of the first balancer shaft $U_{B(Fr)}$ when $\theta_{Cr} = \arctan(\delta/l)°$, $U2_{B(Fr)}$: a X-axis direction component 1 of the unbalance amount of the first balancer shaft $U_{B(Fr)}$ when $\theta_{Cr} = \arctan(\delta/l)°$, $U3_{B(Fr)}$: a Y-axis direction component 2 of the unbalance amount of the first balancer shaft $U_{B(Fr)}$ when $\theta_{Cr} = \arctan(\delta/l)°$, $U4_{B(Fr)}$: a X-axis direction component 2 of the unbalance amount of the first balancer shaft $U_{B(Fr)}$ when $\theta_{Cr} = \arctan(\delta/l)°$, $\alpha_{B(Fr)}$: an angle in an unbalance direction, which is in the forward rotation direction from the Y axis, of the first balancer shaft when $\theta_{Cr} = \arctan(\delta/l)°$, $U_{B(Rr)}$: an unbalance amount of the second balancer shaft $= m_{B(Rr)} \times r_{B(Rr)}$ (where $m_{B(Rr)}$ is the mass of the second balancer shaft, and $r_{B(Rr)}$ is a distance between the axis of the second balancer shaft and the center of gravity of the second balancer shaft), $U1_{B(Rr)}$: a Y-axis direction component 1 of the unbalance amount of the second balancer shaft $U_{B(Rr)}$ when $\theta_{Cr} = \arctan(\delta/l)°$, $U2_{B(Rr)}$: a X-axis direction component 1 of the unbalance amount of the second balancer shaft $U_{B(Rr)}$ when $\theta_{Cr} = \arctan(\delta/l)°$, $U3_{B(Rr)}$: a Y-axis direction component 2 of the unbalance amount of the second balancer shaft $U_{B(Rr)}$ when $\theta_{Cr} = \arctan(\delta/l)°$, $U4_{B(Rr)}$: a X-axis direction component 2 of the unbalance amount of the second balancer shaft $U_{B(Rr)}$ when $\theta_{Cr} = \arctan(\delta/l)°$, and $\alpha_{B(Rr)}$: an angle in an unbalance direction, that is in the forward rotation direction from the Y axis, of the second balancer shaft when $\theta_{Cr} = \arctan(\delta/1°)$.

3. The machine having a reciprocating slider crank mechanism according to claim 1, wherein:
   the machine is a multi-cylinder internal combustion engine; and
   each cylinder is configured so as to satisfy the setting formulae.

4. The machine having a reciprocating slider crank mechanism according to claim 1, wherein the machine is an internal combustion engine installed on a motorcycle.

5. The machine having a reciprocating slider crank mechanism according to claim 4, wherein:
   the crankshaft, the first balancer shaft and the second balancer shaft each extend in a vehicle width direction of the motorcycle;
   the first balancer shaft is arranged forward of the crankshaft; and
   the second balancer shaft is arranged rearward of the crankshaft.

6. The machine having a reciprocating slider crank mechanism according to claim 5, further comprising:
   a transmission;
   a main shaft extending in a vehicle width direction and linked to the crankshaft; and
   a drive shaft extending in the vehicle width direction and linked to the main shaft via the transmission, wherein:
   an axis of the drive shaft is arranged rearward of the axis of the crankshaft;
   an axis of the main shaft is arranged rearward of and above the axis of the crankshaft and forward of and above the axis of the drive shaft;
   the axis of the first balancer shaft is arranged forward of and below the axis of the crankshaft; and
   the axis of the second balancer shaft is arranged rearward of and above the axis of the crankshaft and forward of the axis of the main shaft.

7. A method for manufacturing a machine having a reciprocating slider crank mechanism, the method comprising:
   providing a reciprocal movement portion including
     a piston configured to reciprocate in a cylinder,
     a piston pin, and
     a small end portion of a conrod, the small end portion being connected to the piston by the piston pin;
   providing a rotary movement portion including
     a rotatable crankshaft having a crank pin portion, and
     a big end portion of the conrod, the big end portion being connected to the crank pin portion of the crankshaft;
   providing a first balancer shaft configured to rotate, together with the rotation of the crankshaft, in an opposite rotation direction to that of the crankshaft at a same rotation speed as that of the crankshaft; and
   providing a second balancer shaft arranged on an opposite side from the first balancer shaft with respect to a center line of the cylinder as seen from the axial direction of the crankshaft, the second balancer shaft configured to rotate, together with the rotation of the crankshaft, in an opposite rotation direction to that of the crankshaft at the same rotation speed as that of the crankshaft, wherein:
   an axis of the crankshaft, an axis of the first balancer shaft and an axis of the second balancer shaft are not arranged on a same plane; and
   $U_{Cr}$, $\alpha_{Cr}$, $U_{B(Fr)}$, $U_{B(Rr)}$, $\alpha_{B(Fr)}$ and $\alpha_{B(Rr)}$ are set so as to satisfy a setting formulae below:

$U_{Cr} = U_P \times 0.5$, $\alpha_{Cr} = 180°$, $U_{B(Fr)} = \{U1_{B(Fr)}^2 + U2_{B(Fr)}^2\}^{1/2}$, $U1_{B(Fr)} = -U_P \times 0.5 \times \{Lx'_{B(Rr)}/Lx'_{B(Rr)} - Lx'_{B(Fr)})\}$, $U2_{B(Fr)} = -U_P \times 0.5 \times \{Ly'_B/(Lx'_{B(Rr)} - Lx'_{B(Fr)})\}$, $\alpha_{B(Fr)} = 180° - \arctan(U2_{B(Fr)}/U1_{B(Fr)})$, $U_{B(Rr)}\{U1_{B(Rr)}^2 + U2_{B(Rr)}^2\}^{1/2}$, $U1_{B(Rr)} = -U_P \times 0.5 \times \{Lx'_{B(Fr)}/(Lx'_{B(Fr)} - Lx'_{B(Rr)})\}$, $U2_{B(Rr)} = -U2_{B(Fr)}$, and $\alpha_{B(Rr)} - 180° - \arctan(U2_{B(Rr)}/U1_{B(Rr)})$, where
as seen from the axial direction of the crankshaft, the axis of the crankshaft is an origin, an axis extending from the origin toward the piston along the center line of the cylinder is a Y axis and an axis perpendicular to the Y axis is an X axis,
as seen from the axial direction of the crankshaft, the rotation direction of the crankshaft is a forward rotation direction and an opposite direction to the rotation direction of the crankshaft is a reverse rotation direction,
$Lx_{B(Fr)}$: a X coordinate value of the axis of the first balancer shaft as measured on the X axis
$Ly_{B(Fr)}$: a Y coordinate value of the axis of the first balancer shaft as measured on the Y axis
$Lx_{B(Rr)}$: a X coordinate value of the axis of the second balancer shaft as measured on the X axis
$Ly_{B(Rr)}$: a Y coordinate value of the axis of the second balancer shaft as measured on the Y axis
$\beta$: as seen from the axial direction of the crankshaft, a first angle, in the forward rotation direction, being measured between a straight line connecting between the axis of the first balancer shaft and the axis of the second balancer shaft, and the Y axis, the first angle being $90° + \arctan\{(Ly_{B(Rr)} - Ly_{B(Fr)})/(Lx_{B(Rr)} - Lx_{B(Fr)})\}$,
$\gamma_{B(Fr)}$: as seen from the axial direction of the crankshaft, a second angle, in the forward rotation direction, between a straight line connecting between the axis of the first balancer shaft and the axis of the crankshaft, and the Y axis, the second angle being $90° + \arctan(Ly_{B(Fr)}/Lx_{B(Fr)})$,
$\gamma_{B(Rr)}$: as seen from the axial direction of the crankshaft, a third angle, in the forward rotation direction, between a straight line connecting between the axis of the second balancer shaft and the axis of the crankshaft, and the Y axis, the third angle being $90° + \arctan(Ly_{B(Rr)}/Lx_{B(Rr)})$
X' axis: an axis inclined from the X axis by $\beta - 90°$ in the forward rotation direction,
Y' axis: an axis inclined from the Y axis by $\beta - 90°$ in the forward rotation direction,
$Lx'_{B(Fr)}$ a X' coordinate value of the axis of the first balancer shaft as measured on the X' axis $= (Lx_{B(Fr)} - Ly_{B(Fr)}/\tan\beta) \times \sin\beta$,
$Ly'_B$: a Y' coordinate value of the axis of the first balancer shaft and the second balancer shaft as measured on the Y' axis $= (Lx_{B(Fr)} + Ly_{B(Fr)} \times \tan\beta) \times \cos\beta$,
$Lx'_{B(Rr)}$: a X' coordinate value of the axis of the second balancer shaft as measured on the X' axis $= (Lx_{B(Rr)} - Ly_{B(Rr)}/\tan\beta) \times \sin\beta$,
$\theta_{Cr}$: an angle of rotation of the crankshaft in the forward rotation direction (where $\theta_{Cr}$ is assumed to be 0° when the crank pin portion of the crankshaft is on the Y axis),
$U_P$: an unbalance amount of the reciprocal movement portion $= m_P \times R$ (where $m_P$ is the mass of the reciprocal movement portion, and R is a crank radius),
$U_{Cr}$: an unbalance amount of the rotary movement portion $= m_{Cr} \times r_{Cr}$ (where $m_{Cr}$ is the mass of the rotary movement portion, and $r_{Cr}$ is a distance between the axis of the crankshaft and the center of gravity of the rotary movement portion),
$\alpha_{Cr}$: an angle in an unbalance direction, which is in the forward rotation direction from the Y axis, of the rotary movement portion when $\theta_{Cr} = 0°$,
$U_{B(Fr)}$: an unbalance amount of the first balancer shaft $= m_{B(Fr)} \times r_{B(Fr)}$ (where $M_{B(Fr)}$ is the mass of the first balancer shaft, and $r_{B(Fr)}$ is a distance between the axis of the first balancer shaft and the center of gravity of the first balancer shaft), $U1_{B(Fr)}$: a Y-axis direction component of the unbalance amount of the first balancer shaft=$U_{B(Fr)}$ when $\theta_{Cr}=0°$, $U2_{B(Fr)}$: a X-axis direction component of the unbalance amount of the first balancer shaft=$U_{B(Fr)}$ when $\theta_{Cr}=0°$, $\alpha_{B(Fr)}$: an unbalance direction (the angle in the forward rotation direction from the Y axis) of the first balancer shaft when $\theta_{Cr}=0°$, $U_{B(Rr)}$: an unbalance amount of the second balancer shaft=$m_{B(Rr)} \times r_{B(Rr)}$ (where $m_{B(Rr)}$ is the mass of the second balancer shaft, and $r_{B(Rr)}$ the is a distance between the axis of second balancer shaft and the center of gravity of the second balancer shaft), $U1_{B(Rr)}$: a Y-axis direction component of the unbalance amount of the second balancer shaft=$U_{B(Rr)}$, when $\theta_{Cr}=0°$, $U2_{B(Rr)}$: a X-axis direction component of the unbalance amount of the second balancer shaft=$U_{B(Rr)}$, when $\theta_{Cr}=0°$, and $\alpha_{B(Rr)}$: an angle in an unbalance direction, which is in the forward rotation direction from the Y axis, of the second balancer shaft when $\theta_{Cr}=0°$.

8. A method for manufacturing a machine having a reciprocating slider crank mechanism, the method comprising:

providing a reciprocal movement portion including
a piston configured to reciprocate in a cylinder,
a piston pin, and
a small end portion of a conrod, the small end portion being connected to the piston by the piston pin;

providing a rotary movement portion including
a rotatable crankshaft having a crank pin portion, and
a big end portion of the conrod, the big end portion being connected to the crank pin portion of the crankshaft;

providing a first balancer shaft configured to rotate, together with the rotation of the crankshaft, in an opposite rotation direction to that of the crankshaft at a same rotation speed as that of the crankshaft; and providing a second balancer shaft arranged on an opposite side from the first balancer shaft with respect to a center line of the cylinder as seen from the axial direction of the crankshaft, and the second balancer shaft configured to rotate, together with the rotation of the crankshaft, in an opposite rotation direction to that of the crankshaft at the same rotation speed as that of the crankshaft, wherein:

an axis of the crankshaft, an axis of the first balancer shaft and an axis of the second balancer shaft are not arranged on a same plane;

as seen from the axial direction of the crankshaft, a center line of the cylinder is offset from the axis of the crankshaft; and $U_{Cr}$, $\alpha_{Cr}$, $U_{B(Fr)}$, $U_{B(Rr)}$, $\alpha_{B(Fr)}$ and $\alpha_{B(Rr)}$ are set so as to satisfy a setting formulae below:

$$U_{Cr}=U_P \times 0.5 \times \{1+(\delta/l)^2\}^{1/2},$$

$$\alpha_{Cr}=180°-\arctan(\delta/l),$$

$$U_{B(Fr)}=\{(U1_{B(Fr)}+U3_{B(Fr)})^2+(U2_{B(Fr)}+U4_{B(Fr)})^2\}^{1/2},$$

$$U1_{B(Fr)}=-U_P \times 0.5 \times \{Lx'_{B(Rr)}/(Lx'_{B(Rr)}-Lx'_{B(Fr)})\} \times \{1+(\delta/l)^2\}^{1/2},$$

$$U2_{B(Fr)}=-U_P \times 0.5 \times \{Ly'_B/(Lx'_{B(Rr)}-Lx'_{B(Fr)})\} \times \{1+(\delta/l)^2\}^{1/2},$$

$$U3_{B(Fr)}=-U_P \times \{\delta/(Lx'_{B(Rr)}-Lx'_{B(Fr)})\} \times \sin\beta \times \{1+(\delta/l)^2\}^{1/2},$$

$$U4_{B(Fr)}=-U_P \times \{\delta/(Lx'_{B(Rr)}-Lx'_{B(Fr)})\} \times \cos\beta \times \{1+(\delta/l)^2\}^{1/2},$$

$$\alpha_{B(Fr)}=180°-\arctan\{(U2_{B(Fr)}+U4_{B(Fr)})/(U1_{B(Fr)}+U3_{B(Fr)})\}+\arctan(\delta/l),$$

$$U_{B(Rr)}=\{(U1_{B(Rr)}+U3_{B(Rr)})^2+(U2_{B(Rr)}+U4_{B(Rr)})^2\}^{1/2},$$

$$U1_{B(Rr)}=-U_P \times 0.5 \times \{Lx'_{B(Fr)}/(Lx'_{B(Fr)}-Lx'_{B(Rr)})\} \times \{1+\delta/l)^2\}^{1/2},$$

$$U2_{B(Rr)}=-U2_{B(Fr)},$$

$$U3_{B(Rr)}=-U3_{B(Fr)},$$

$$U4_{B(Rr)}=-U4_{B(Fr)}, \text{ and}$$

$$\alpha_{B(Rr)}=180°-\arctan\{(U2_{B(Rr)}+U4_{B(Rr)})/(U1_{B(Rr)}+U3_{B(Rr)})\}+\arctan(\delta/l),$$

where as seen from the axial direction of the crankshaft, the axis of the crankshaft is an origin, an axis extending from the origin toward the piston in parallel to the center line of the cylinder is a Y axis and an axis perpendicular to the Y axis is an X axis, as seen from the axial direction of the crankshaft, the rotation direction of the crankshaft is a forward rotation direction and an opposite direction to the rotation direction of the crankshaft is a reverse rotation direction, $Lx_{B(Fr)}$: a X coordinate value of the axis of the first balancer shaft as measured on the X axis, $Ly_{B(Fr)}$: a Y coordinate value of the axis of the first balancer shaft as measured on the Y axis, $Lx_{B(Rr)}$: a X coordinate value of the axis of the second balancer shaft as measured on the X axis, $Ly_{B(Rr)}$: a Y coordinate value of the axis of the second balancer shaft as measured on the Y axis, l: a distance between a center of the piston pin and a center of the crank pin portion, $\delta$: an amount of offset of the cylinder, $\beta$: as seen from the axial direction of the crankshaft, a first angle, in the forward rotation direction, being measured between a straight line, connecting between the axis of the first balancer shaft and the axis of the second balancer shaft, and the Y axis, the first angle being $90°+\arctan\{(Ly_{B(Rr)}-Ly_{B(Fr)})/(Lx_{B(Rr)}-Lx_{B(Fr)})\}$, $\gamma_{B(Fr)}$: as seen from the axial direction of the crankshaft, a second angle, in the forward rotation direction, between a straight line, connecting between the axis of the first balancer shaft and the axis of the crankshaft, and the Y axis, the second angle being $90°+\arctan(Ly_{B(Fr)}/Lx_{B(Fr)})$, $\gamma_{B(Rr)}$: as seen from the axial direction of the crankshaft, a third angle, in the forward rotation direction, between a straight line, connecting between the axis of the second balancer shaft and the axis of the crankshaft, and the Y axis, the third angle being $90°+\arctan(Ly_{B(Rr)}/Lx_{B(Rr)})$ X' axis: an axis inclined from the X axis by $\beta-90°$ in the forward rotation direction, Y' axis: an axis inclined from the Y axis by $\beta-90°$ in the forward rotation direction, $Lx'_{B(Fr)}$: a X' coordinate value of the axis of the first balancer shaft as measured on the X' axis=$(Lx_{B(Fr)} - Ly_{B(Fr)}/\tan \beta) \times \sin \beta$, $Ly'_B$: a Y' coordinate value of the axis of the first balancer shaft and the second balancer shaft as measured on the Y' axis=$(Lx_{B(Fr)} + Ly_{B(Fr)} \times \tan \beta) \times \cos \beta$ $Lx'_{B(Rr)}$: a X' coordinate value of the axis of the second balancer shaft as measured on the X' axis=$(Lx_{B(Rr)} - Ly_{B(Rr)}/\tan \beta) \times \sin \beta$ $\theta_{Cr}$: an angle of rotation of the crankshaft in the forward rotation direction (where $\theta_{Cr}$ is assumed to be 0° when the crank pin portion of the crankshaft is on the Y axis), $U_P$: an unbalance amount of the reciprocal movement portion=$m_P \times R$ (where $m_P$ is the mass of the reciprocal movement portion, and R is a crank radius), $U_{Cr}$: an unbalance amount of the rotary movement portion=$m_{Cr} \times r_{Cr}$ (where $m_{Cr}$ is the mass of the rotary movement portion, and $r_{Cr}$ is a distance between the axis of the crankshaft and the center of gravity of the rotary movement portion), $\alpha_{Cr}$: an angle in an unbalance direction, which is in the forward rotation direction from the Y axis of the rotary movement portion when $\theta_{Cr}=\arctan(\delta/l)°$, $U_{B(Fr)}$: an unbalance amount of the first balancer shaft=$m_{B(Fr)} \times r_{B(Fr)}$ (where $M_{B(Fr)}$ is the mass of the first balancer shaft, and $r_{B(Fr)}$ is a distance between the axis of the first balancer shaft and the center of gravity of the first balancer shaft), $U1_{B(Fr)}$: a Y-axis direction component 1 of the unbalance amount of the first balancer shaft $U_{B(Fr)}$ when $\theta_{Cr}=\arctan(\delta/l)°$, $U2_{B(Fr)}$: a X-axis direction component 1 of the unbalance amount of the first balancer shaft $U_{B(Fr)}$ when $\theta_{Cr}=\arctan(\delta/l)°$, $U3_{B(Fr)}$: a Y-axis direction component 2 of the unbalance amount of the first balancer shaft $U_{B(Fr)}$ when $\theta_{Cr}=\arctan(\delta/l)°$, $U4_{B(Fr)}$: a X-axis direction component 2 of the unbalance amount of the first balancer shaft $U_{B(Fr)}$ when $\theta_{Cr}=\arctan(\delta/l)°$, $\alpha_{B(Fr)}$: an angle in an unbalance direction, which is in the forward rotation direction from the Y axis, of the first balancer shaft when $\theta_{Cr}=\arctan(\delta/l)°$, $U_{B(Rr)}$: an unbalance amount of the second balancer shaft=$m_{B(Rr)} \times r_{B(Rr)}$ (where $m_{B(Rr)}$ is the mass of the second balancer shaft, and $r_{B(Rr)}$ is a distance between the axis of the second balancer shaft and the center of gravity of the second balancer shaft), $U1_{B(Rr)}$: a Y-axis direction component 1 of the unbalance amount of the second balancer shaft $U_{B(Rr)}$ when $\theta_{Cr}=\arctan(\delta/l)°$, $U2_{B(Rr)}$: a X-axis direction component 1 of the unbalance amount of the second balancer shaft $U_{B(Rr)}$ when $\theta_{Cr}=\arctan(\delta/l)°$, $U3_{B(Rr)}$: a Y-axis direction component 2 of the unbalance amount of the second balancer shaft $U_{B(Rr)}$ when $\theta_{Cr}=\arctan(\delta/l)°$, $U4_{B(Rr)}$: a X-axis direction component 2 of the unbalance amount of the second balancer shaft $U_{B(Rr)}$ when $\theta_{Cr}=\arctan(\delta/l)°$, and $\alpha_{B(Rr)}$: an angle in an unbalance direction, that is in the forward rotation direction from the Y axis, of the second balancer shaft when $\theta_{Cr}=\arctan(\delta/l)°$.

* * * * *